(12) United States Patent
Uchida et al.

(10) Patent No.: US 8,379,309 B2
(45) Date of Patent: Feb. 19, 2013

(54) ZOOM LENS SYSTEM, INTERCHANGEABLE LENS APPARATUS AND CAMERA SYSTEM

(75) Inventors: Tsuneo Uchida, Chiba (JP); Koji Hoshi, Kanagawa (JP)

(73) Assignee: Panasonic Corporation, Kadoma-shi (JP)

(*) Notice: Subject to any disclaimer, the term of this patent is extended or adjusted under 35 U.S.C. 154(b) by 24 days.

(21) Appl. No.: 13/229,777

(22) Filed: Sep. 12, 2011

(65) Prior Publication Data

US 2012/0062994 A1    Mar. 15, 2012

(30) Foreign Application Priority Data

Sep. 13, 2010   (JP) .................................. 2010-204174
Jul. 7, 2011    (JP) .................................. 2011-151047

(51) Int. Cl.
*G02B 27/64*    (2006.01)
*G02B 15/14*    (2006.01)

(52) U.S. Cl. ...................................... 359/557; 359/676

(58) Field of Classification Search .................. 359/676, 359/686–688, 680–682, 684, 557
See application file for complete search history.

(56) References Cited

U.S. PATENT DOCUMENTS

2004/0042087 A1* 3/2004 Takato .......................... 359/694

FOREIGN PATENT DOCUMENTS

| JP | H04-338910 A | 11/1992 |
|----|--------------|---------|
| JP | H06-118305 A | 4/1994  |
| JP | 2003-107353 A | 4/2003 |
| JP | 2004-094056 A | 3/2004 |

* cited by examiner

*Primary Examiner* — James Greece
*Assistant Examiner* — Sharrief Broome
(74) *Attorney, Agent, or Firm* — Judge Patent Associates

(57) ABSTRACT

A zoom lens system comprising a positive first lens unit, a positive second lens unit, and at least two subsequent lens units, wherein the first lens unit moves along an optical axis at the time of zooming, an interval between the second lens unit and one of the at least two subsequent lens units varies at the time of zooming or focusing, the first lens unit is composed of at least three lens elements, each of the first lens unit and the second lens unit includes at least one negative lens element, and the conditions: $0.008 < (1/vd_{MIN}) - (1/vd_{MAX}) < 0.028$ and $0.1 < |m|/(f_T - f_W) < 0.4$ ($vd_{MIN}$ and $vd_{MAX}$: minimum value and maximum value among Abbe numbers to the d-line of each lens element constituting the first lens unit, m: maximum value among the amounts of movement of each subsequent lens unit at the time of zooming, $f_T$ and $f_W$: focal lengths of the entire system at a telephoto limit and at a wide-angle limit) are satisfied; an interchangeable lens apparatus; and a camera system are provided.

8 Claims, 19 Drawing Sheets

ZOOM LENS SYSTEM, INTERCHANGEABLE LENS APPARATUS AND CAMERA SYSTEM

CROSS-REFERENCE TO RELATED APPLICATION

This application is based on application No. 2010-204174 filed in Japan on Sep. 13, 2010 and application No. 2011-151047 filed in Japan on Jul. 7, 2011, the contents of which are hereby incorporated by reference.

BACKGROUND OF THE INVENTION

1. Field of the Invention

The present invention relates to a zoom lens system, an interchangeable lens apparatus, and a camera system. In particular, the present invention relates to: a zoom lens system which is suitable as an imaging lens system in, so-called, an interchangeable-lens type digital camera system; and an interchangeable lens apparatus and a camera system each employing this zoom lens system.

2. Description of the Background Art

In recent years, interchangeable-lens type digital camera systems have been spreading rapidly. Such interchangeable-lens type digital camera systems (also referred to simply as "camera systems", hereinafter) include: a camera body having an image sensor such as a CCD (Charge Coupled Device), a CMOS (Complementary Metal-Oxide Semiconductor) or the like; and an interchangeable lens apparatus having an imaging lens system for forming an optical image on a light receiving surface of the image sensor.

Such interchangeable-lens type digital camera systems are able to take a high-sensitive and high-quality image because an image sensor used in the interchangeable-lens type digital camera systems is larger than that equipped for a compact type digital camera. In addition, the interchangeable-lens type digital camera systems can realize: high-speed focusing and high-speed image processing after image taking; and easy replacement of an interchangeable lens apparatus in accordance with a desired scene. Furthermore, an interchangeable lens apparatus having a zoom lens system that forms an optical image with variable magnification is popular because it allows free change of focal length without the necessity of lens replacement. Accordingly, for some time, various kinds of zoom lens systems have been proposed, which can be utilized as an imaging lens system in the interchangeable-lens type digital camera systems, such as a zoom lens system disclosed in each of Japanese Laid-Open Patent Publications No. 2004-094056, No. 2003-107353, No. 04-338910, and No. 06-118305.

Although the interchangeable-lens type digital camera systems show the above-mentioned various kinds of merits, the size and the weight of such interchangeable-lens type digital camera systems are greater than those of a compact type digital camera. It is preferable that the size and the weight of the interchangeable-lens type digital camera systems are as small as possible for easy carrying around and handling. Accordingly, a most compact and lightweight possible zoom lens system with maintaining imaging performance is desired as a zoom lens system to be used in the interchangeable-lens type digital camera systems.

SUMMARY OF THE INVENTION

One object of the present invention is to provide a compact and lightweight zoom lens system having excellent imaging performance, which can be suitably used in an interchangeable-lens type digital camera system. Another object of the present invention is to provide compact and lightweight interchangeable lens apparatus and camera system.

The novel concepts disclosed herein were achieved in order to solve the foregoing problems in the conventional art, and herein is disclosed:

a zoom lens system having a plurality of lens units, each lens unit being composed of at least one lens element, the zoom lens system, in order from an object side to an image side, comprising:

a first lens unit having positive optical power;
a second lens unit having positive optical power; and
at least two subsequent lens units, wherein
the first lens unit moves along an optical axis at the time of zooming from a wide-angle limit to a telephoto limit,
an interval between the second lens unit and a lens unit which is one of the at least two subsequent lens units varies at the time of zooming or at the time of focusing from an infinity in-focus condition to a close-object in-focus condition,
the first lens unit is composed of at least three lens elements,
each of the first lens unit and the second lens unit includes at least one lens element having negative optical power, and
the following conditions (1) and (2) are satisfied:

$$0.008 < (1/vd_{MIN}) - (1/vd_{MAX}) < 0.028 \qquad (1)$$

$$0.1 < |m|/(f_T - f_W) < 0.4 \qquad (2)$$

where $vd_{MIN}$ is the minimum value among Abbe numbers to the d-line of each lens element constituting the first lens unit,
$vd_{MAX}$ is the maximum value among Abbe numbers to the d-line of each lens element constituting the first lens unit,
m is the maximum value among the amounts of movement of each subsequent lens unit at the time of zooming from a wide-angle limit to a telephoto limit,
$f_T$ is a focal length of the entire system at a telephoto limit, and
$f_W$ is a focal length of the entire system at a wide-angle limit.

The novel concepts disclosed herein were achieved in order to solve the foregoing problems in the conventional art, and herein is disclosed:

an interchangeable lens apparatus comprising:
a zoom lens system; and
a lens mount section which is connectable to a camera body including an image sensor for receiving an optical image formed by the zoom lens system and converting the optical image into an electric image signal; wherein
the zoom lens system, having a plurality of lens units, each lens unit being composed of at least one lens element, in order from an object side to an image side, comprises:

a first lens unit having positive optical power;
a second lens unit having positive optical power; and
at least two subsequent lens units, wherein
the first lens unit moves along an optical axis at the time of zooming from a wide-angle limit to a telephoto limit,
an interval between the second lens unit and a lens unit which is one of the at least two subsequent lens units varies at the time of zooming or at the time of focusing from an infinity in-focus condition to a close-object in-focus condition,
the first lens unit is composed of at least three lens elements,
each of the first lens unit and the second lens unit includes at least one lens element having negative optical power, and
the following conditions (1) and (2) are satisfied:

$$0.008 < (1/vd_{MIN}) - (1/vd_{MAX}) < 0.028 \qquad (1)$$

$$0.1 < |m|/(f_T - f_W) < 0.4 \qquad (2)$$

where $vd_{MIN}$ is the minimum value among Abbe numbers to the d-line of each lens element constituting the first lens unit, $vd_{MAX}$ is the maximum value among Abbe numbers to the d-line of each lens element constituting the first lens unit, m is the maximum value among the amounts of movement of each subsequent lens unit at the time of zooming from a wide-angle limit to a telephoto limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera system comprising:

an interchangeable lens apparatus including a zoom lens system; and a camera body which is detachably connected to the interchangeable lens apparatus via a camera mount section, and includes an image sensor for receiving an optical image formed by the zoom lens system and converting the optical image into an electric image signal; wherein the zoom lens system, having a plurality of lens units, each lens unit being composed of at least one lens element, in order from an object side to an image side, comprises:

a first lens unit having positive optical power;

a second lens unit having positive optical power; and at least two subsequent lens units, wherein the first lens unit moves along an optical axis at the time of zooming from a wide-angle limit to a telephoto limit, an interval between the second lens unit and a lens unit which is one of the at least two subsequent lens units varies at the time of zooming or at the time of focusing from an infinity in-focus condition to a close-object in-focus condition, the first lens unit is composed of at least three lens elements, each of the first lens unit and the second lens unit includes at least one lens element having negative optical power, and the following conditions (1) and (2) are satisfied:

$$0.008 < (1/vd_{MIN}) - (1/vd_{MAX}) < 0.028 \quad (1)$$

$$0.1 < |m|/(f_T - f_W) < 0.4 \quad (2)$$

where $vd_{MIN}$ is the minimum value among Abbe numbers to the d-line of each lens element constituting the first lens unit, $vd_{MAX}$ is the maximum value among Abbe numbers to the d-line of each lens element constituting the first lens unit, m is the maximum value among the amounts of movement of each subsequent lens unit at the time of zooming from a wide-angle limit to a telephoto limit, $f_T$ is a focal length of the entire system at a telephoto limit, and $f_W$ is a focal length of the entire system at a wide-angle limit.

According to the present invention, it is possible to provide: a compact and lightweight zoom lens system having excellent imaging performance; and an interchangeable lens apparatus and a camera system each employing this zoom lens system.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

FIGS. 1, 4, 7, 10, 13, and 16 are lens arrangement diagrams of zoom lens systems according to Embodiments 1, 2, 3, 4, 5, and 6 respectively. Each Fig. shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W*f_T)}$), and part (c) shows a lens configuration at a telephoto limit (in the maximum focal length condition: focal length $f_T$). Further, in each Fig., an arrow of straight or curved line provided between part (a) and part (b) indicates the movement of each lens unit from a wide-angle limit through a middle position to a telephoto limit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

Figure 13:
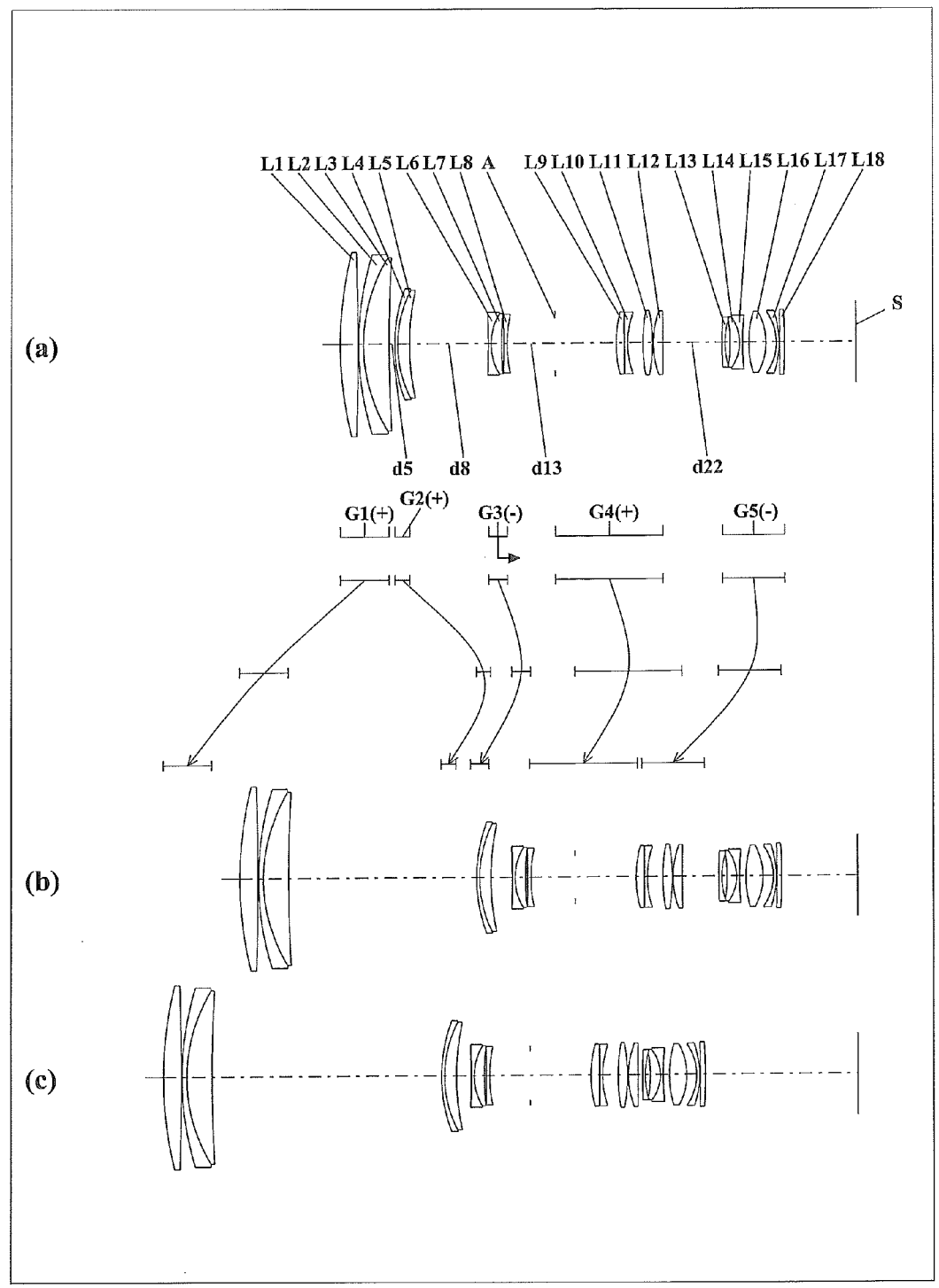
FIG. 13 is a lens arrangement diagram showing an infinity in-focus condition of a zoom lens system according to Embodiment 5 (Example 5)
Figure 14:
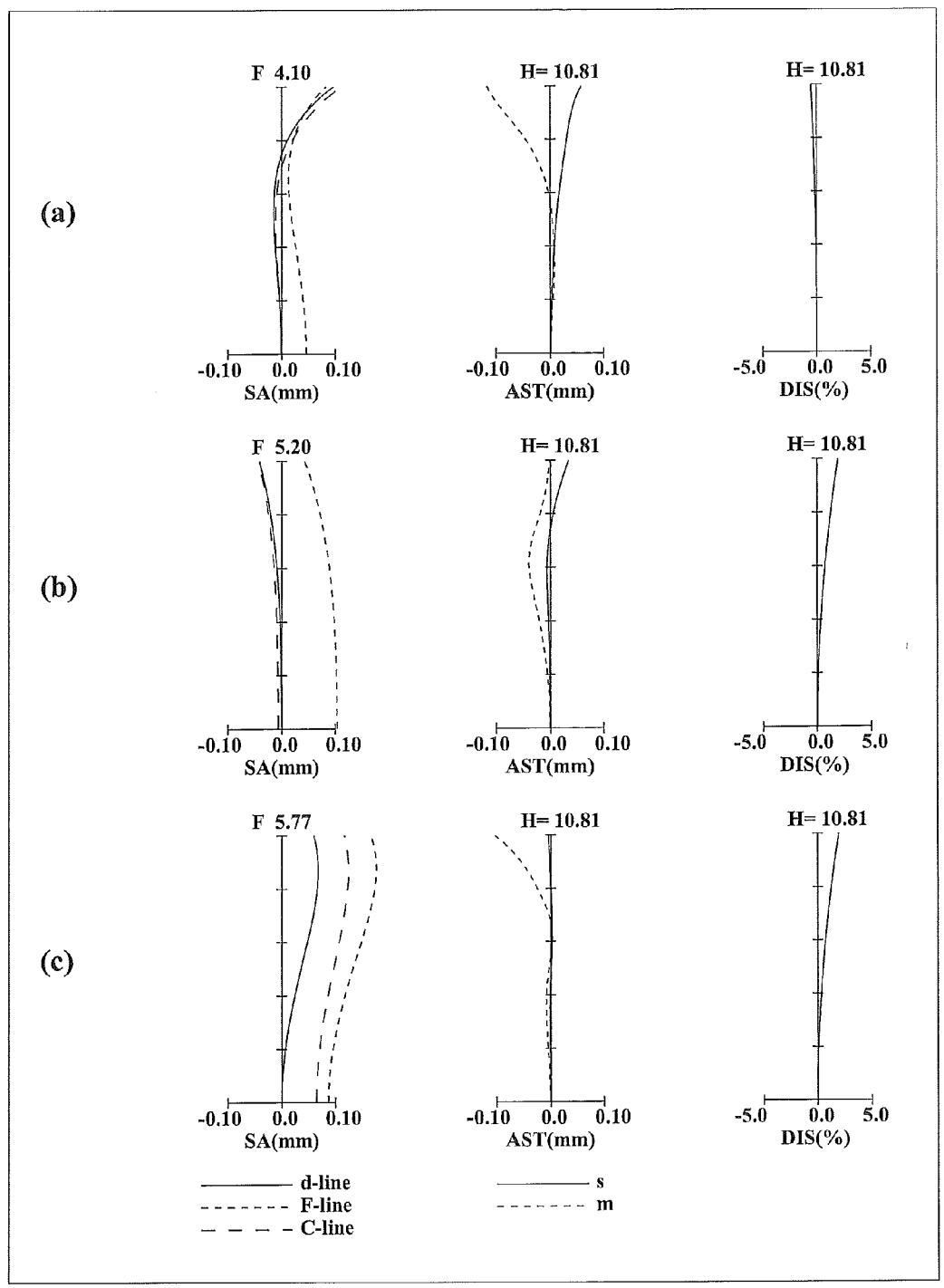
FIG. 14 is a longitudinal aberration diagram of an infinity in-focus condition of a zoom lens system according to Example 5.
Figure 15:
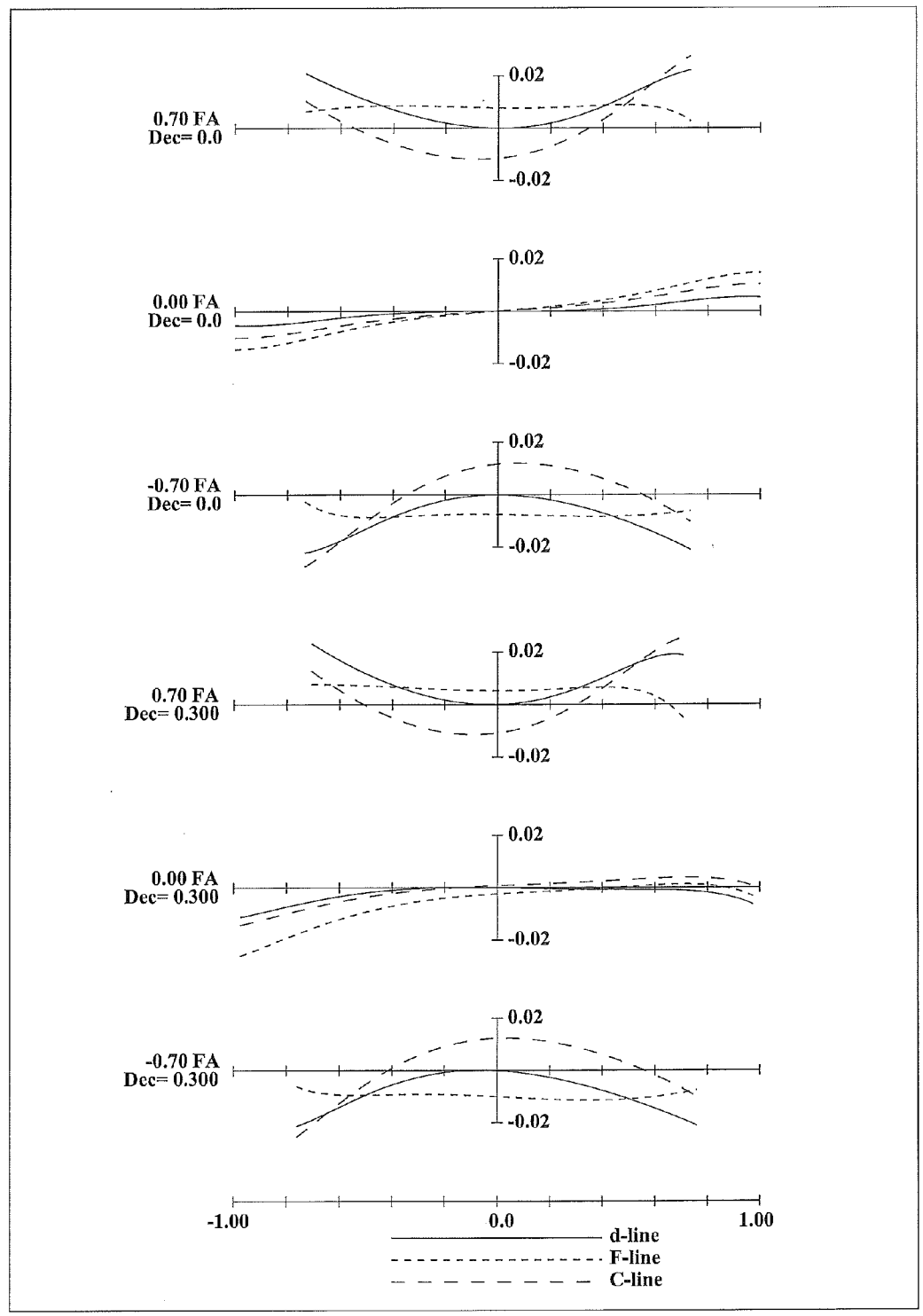
FIG. 15 is a lateral aberration diagram of a zoom lens system according to Example 5 at a telephoto limit in a basic state where image blur compensation is not performed and in an image blur compensation state.

In each Fig., symbol (+) or (−) imparted to the symbol of each lens unit corresponds to the sign of the optical power of the lens unit. In each Fig., the straight line located on the most right-hand side indicates the position of the image surface S. As shown in FIGS. 1, 4, 7, 10, and 16, an aperture diaphragm A is provided within a third lens unit G3. Further, as shown in FIG. 13, an aperture diaphragm A is provided within a fourth lens unit G4.

Each of the zoom lens systems according to Embodiments 1, 4, and 5, in order from the object side to the image side, comprises a first lens unit G1 having positive optical power, a second lens unit G2 having positive optical power, and subsequent lens units, that is, a third lens unit G3, a fourth lens unit G4, and a fifth lens unit G5. Further, Each of the zoom lens systems according to Embodiments 2, 3, and 6, in order from the object side to the image side, comprises a first lens unit G1 having positive optical power, a second lens unit G2 having positive optical power, and subsequent lens units, that is, a third lens unit G3, a fourth lens unit G4, a fifth lens unit G5, and a sixth lens unit G6.

Embodiment 1

The first lens unit G1, in order from the object side to the image side, comprises: a positive meniscus first lens element L1 with the convex surface facing the object side; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; and a positive meniscus fifth lens element L5 with the convex surface facing the object side. The fourth lens element L4 and the fifth lens element L5 are cemented with each other.

The third lens unit G3, in order from the object side to the image side, comprises: a bi-concave sixth lens element L6; a negative meniscus seventh lens element L7 with the convex surface facing the object side; a positive meniscus eighth lens element L8 with the convex surface facing the object side; an aperture diaphragm A; a bi-convex ninth lens element L9; a negative meniscus tenth lens element L10 with the convex surface facing the object side; and a bi-convex eleventh lens element L11.

The fourth lens unit G4, in order from the object side to the image side, comprises: a negative meniscus twelfth lens element L12 with the convex surface facing the object side; a positive meniscus thirteenth lens element L13 with the convex surface facing the image side; and a bi-concave fourteenth lens element L14. The thirteenth lens element L13 and the fourteenth lens element L14 are cemented with each other.

The fifth lens unit G5, in order from the object side to the image side, comprises: a bi-convex fifteenth lens element L15; a negative meniscus sixteenth lens element L16 with the convex surface facing the image side; and a bi-convex seventeenth lens element L17.

Embodiment 2

The first lens unit G1, in order from the object side to the image side, comprises: a planer-convex first lens element L1 with the convex surface facing the object side; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; and a positive meniscus fifth lens element L5 with the convex surface facing the object side. The fourth lens element L4 and the fifth lens element L5 are cemented with each other.

The third lens unit G3, in order from the object side to the image side, comprises: a bi-concave sixth lens element L6; a bi-convex seventh lens element L7; a bi-concave eighth lens element L8; and an aperture diaphragm A. The seventh lens element L7 and the eighth lens element L8 are cemented with each other.

The fourth lens unit G4, in order from the object side to the image side, comprises: a bi-convex ninth lens element L9; a negative meniscus tenth lens element L10 with the convex surface facing the object side; and a bi-convex eleventh lens element L11. The tenth lens element L10 and the eleventh lens element L11 are cemented with each other.

The fifth lens unit G5, in order from the object side to the image side, comprises: a negative meniscus twelfth lens element L12 with the convex surface facing the object side; a positive meniscus thirteenth lens element L13 with the convex surface facing the image side; and a bi-concave fourteenth lens element L14. The thirteenth lens element L13 and the fourteenth lens element L14 are cemented with each other.

The sixth lens unit G6, in order from the object side to the image side, comprises: a bi-convex fifteenth lens element L15; a negative meniscus sixteenth lens element L16 with the convex surface facing the image side; and a positive meniscus seventeenth lens element L17 with the convex surface facing the object side.

Embodiment 3

The first lens unit G1, in order from the object side to the image side, comprises: a planer-convex first lens element L1 with the convex surface facing the object side; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; and a positive meniscus fifth lens element L5 with the convex surface facing the object side. The fourth lens element L4 and the fifth lens element L5 are cemented with each other.

The third lens unit G3, in order from the object side to the image side, comprises: a bi-concave sixth lens element L6; a positive meniscus seventh lens element L7 with the convex surface facing the object side; a negative meniscus eighth lens element L8 with the convex surface facing the object side; and an aperture diaphragm A. The seventh lens element L7 and the eighth lens element L8 are cemented with each other.

The fourth lens unit G4, in order from the object side to the image side, comprises: a bi-convex ninth lens element L9; a negative meniscus tenth lens element L10 with the convex surface facing the object side; and a bi-convex eleventh lens element L11. The tenth lens element L10 and the eleventh lens element L11 are cemented with each other.

The fifth lens unit G5, in order from the object side to the image side, comprises: a negative meniscus twelfth lens element L12 with the convex surface facing the object side; a positive meniscus thirteenth lens element L13 with the convex surface facing the image side; and a bi-concave fourteenth lens element L14. The thirteenth lens element L13 and the fourteenth lens element L14 are cemented with each other.

The sixth lens unit G6, in order from the object side to the image side, comprises: a bi-convex fifteenth lens element L15; a negative meniscus sixteenth lens element L16 with the convex surface facing the image side; and a positive meniscus seventeenth lens element L17 with the convex surface facing the object side.

Embodiment 4

The first lens unit G1, in order from the object side to the image side, comprises: a planer-convex first lens element L1 with the convex surface facing the object side; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; and a planer-convex fifth lens element L5 with the convex surface facing the object side. The fourth lens element L4 and the fifth lens element L5 are cemented with each other.

The third lens unit G3, in order from the object side to the image side, comprises: a bi-concave sixth lens element L6; a bi-convex seventh lens element L7; a bi-concave eighth lens element L8; an aperture diaphragm A; a bi-convex ninth lens element L9; a negative meniscus tenth lens element L10 with the convex surface facing the object side; and a bi-convex eleventh lens element L11. The seventh lens element L7 and the eighth lens element L8 are cemented with each other, and the tenth lens element L10 and the eleventh lens element L11 are cemented with each other.

The fourth lens unit G4, in order from the object side to the image side, comprises: a negative meniscus twelfth lens element L12 with the convex surface facing the object side; a positive meniscus thirteenth lens element L13 with the convex surface facing the image side; and a bi-concave fourteenth lens element L14. The thirteenth lens element L13 and the fourteenth lens element L14 are cemented with each other.

The fifth lens unit G5, in order from the object side to the image side, comprises: a bi-convex fifteenth lens element L15; a negative meniscus sixteenth lens element L16 with the convex surface facing the image side; and a bi-convex seventeenth lens element L17.

Embodiment 5

The first lens unit G1, in order from the object side to the image side, comprises: a bi-convex first lens element L1; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; and a positive meniscus fifth lens element L5 with the convex surface facing the object side. The fourth lens element L4 and the fifth lens element L5 are cemented with each other.

The third lens unit G3, in order from the object side to the image side, comprises: a bi-concave sixth lens element L6; a positive meniscus seventh lens element L7 with the convex surface facing the object side; and a bi-concave eighth lens element L8. The sixth lens element L6 and the seventh lens element L7 are cemented with each other The fourth lens unit G4, in order from the object side to the image side, comprises: an aperture diaphragm A; a bi-convex ninth lens element L9; a planer-concave tenth lens element L10 with the concave surface facing the image side; a bi-convex eleventh lens element L11; and a positive meniscus twelfth lens element L12 with the convex surface facing the object side.

The fifth lens unit G5, in order from the object side to the image side, comprises: a negative meniscus thirteenth lens element L13 with the convex surface facing the object side; a positive meniscus fourteenth lens element L14 with the convex surface facing the image side; a bi-concave fifteenth lens element L15; a bi-convex sixteenth lens element L16; a negative meniscus seventeenth lens element L17 with the convex surface facing the image side; and a positive meniscus eighteenth lens element L18 with the convex surface facing the image side. The fourteenth lens element L14 and the fifteenth lens element L15 are cemented with each other.

Embodiment 6

The first lens unit G1, in order from the object side to the image side, comprises: a planer-convex first lens element L1 with the convex surface facing the object side; a negative meniscus second lens element L2 with the convex surface facing the object side; and a positive meniscus third lens element L3 with the convex surface facing the object side. The second lens element L2 and the third lens element L3 are cemented with each other.

The second lens unit G2, in order from the object side to the image side, comprises: a negative meniscus fourth lens element L4 with the convex surface facing the object side; and a positive meniscus fifth lens element L5 with the convex surface facing the object side. The fourth lens element L4 and the fifth lens element L5 are cemented with each other.

The third lens unit G3, in order from the object side to the image side, comprises: a bi-concave sixth lens element L6; a bi-convex seventh lens element L7; a bi-concave eighth lens element L8; and an aperture diaphragm A. The seventh lens element L7 and the eighth lens element L8 are cemented with each other.

The fourth lens unit G4, in order from the object side to the image side, comprises: a bi-convex ninth lens element L9; a negative meniscus tenth lens element L10 with the convex surface facing the object side; and a bi-convex eleventh lens element L11. The tenth lens element L10 and the eleventh lens element L11 are cemented with each other.

The fifth lens unit G5, in order from the object side to the image side, comprises: a negative meniscus twelfth lens element L12 with the convex surface facing the object side; a positive meniscus thirteenth lens element L13 with the convex surface facing the image side; and a bi-concave fourteenth lens element L14. The thirteenth lens element L13 and the fourteenth lens element L14 are cemented with each other.

The sixth lens unit G6, in order from the object side to the image side, comprises: a bi-convex fifteenth lens element L15; a negative meniscus sixteenth lens element L16 with the convex surface facing the image side; and a positive meniscus seventeenth lens element L17 with the convex surface facing the object side.

In the zoom lens systems according to Embodiments 1, 4, and 5, at the time of zooming from a wide-angle limit to a telephoto limit, the second lens unit G2 in the zoom lens system according to Embodiment 5 moves to the image side along the optical axis while each of the lens units other than this second lens unit G5 moves to the object side along the optical axis so that the interval between the first lens unit G1 and the second lens unit G2 is longer at a telephoto limit than at a wide-angle limit, the interval between the second lens unit G2 and the third lens unit G3 is shorter at a telephoto limit than at a wide-angle limit, the interval between the third lens unit G3 and the fourth lens unit G4 is shorter at a telephoto limit than at a wide-angle limit, and the interval between the fourth lens unit G4 and the fifth lens unit G5 is shorter at a telephoto limit than at a wide-angle limit.

In the zoom lens systems according to Embodiments 2 and 3, at the time of zooming from a wide-angle limit to a telephoto limit, each of the lens units moves to the object side along the optical axis so that the interval between the first lens unit G1 and the second lens unit G2 is longer at a telephoto limit than at a wide-angle limit, the interval between the second lens unit G2 and the third lens unit G3 is shorter at a telephoto limit than at a wide-angle limit, the interval between the third lens unit G3 and the fourth lens unit G4 is shorter at a telephoto limit than at a wide-angle limit, the interval between the fourth lens unit G4 and the fifth lens unit G5 is shorter at a telephoto limit than at a wide-angle limit, and the interval between the fifth lens unit G5 and the sixth lens unit G6 is shorter at a telephoto limit than at a wide-angle limit.

In the zoom lens system according to Embodiment 6, at the time of zooming from a wide-angle limit to a telephoto limit, each of the lens units moves to the object side along the optical axis so that the interval between the first lens unit G1 and the second lens unit G2 is longer at a telephoto limit than at a wide-angle limit, the interval between the second lens unit G2 and the third lens unit G3 at a telephoto limit is equal to the interval at a wide-angle limit, the interval between the third lens unit G3 and the fourth lens unit G4 is longer at a telephoto limit than at a wide-angle limit, the interval between the fourth lens unit G4 and the fifth lens unit G5 is shorter at a telephoto limit than at a wide-angle limit, and the interval between the fifth lens unit G5 and the sixth lens unit G6 is shorter at a telephoto limit than at a wide-angle limit. Particularly, the interval between the second lens unit G2 and the third lens unit G3 does not vary at the time of zooming from a wide-angle limit to a telephoto limit, while the interval varies only at the time of focusing from an infinity in-focus condition to a close-object in-focus condition.

In the zoom lens systems according to Embodiments 1 to 4, and 6, the aperture diaphragm A moves together with the third lens unit G3 along the optical axis. In the zoom lens system according to Embodiment 5, the aperture diaphragm A moves together with the fourth lens unit G4 along the optical axis. Also, in the zoom lens systems according to Embodiments 1 to 6, each of the lens units individually moves along the optical axis at the time of zooming or at the time of focusing.

Each of the zoom lens systems according to Embodiments 1 to 6 comprises the first lens unit G1 having positive optical power, the second lens unit G2 having positive optical power, and at least two subsequent lens units. In the zoom lens systems according to Embodiments 1 to 6, light passing through the optical system is converged by the first lens unit G1 having positive optical power, and thereby the height of an incident light beam to the second lens unit G2 and the subsequent lens units can be reduced. As a result, the size and the weight of a focusing lens unit in a zoom lens system which adopts an inner-focus method can be reduced. Moreover, because the first lens unit G1 moves along the optical axis at the time of zooming from a wide-angle limit to a telephoto limit, the size and the weight of the focusing lens unit in the zoom lens system which adopts an inner-focus method can be more effectively reduced.

In the zoom lens systems according to Embodiments 1 to 6, because the interval between the second lens unit G2 and a lens unit which is one of the at least two subsequent lens units varies at the time of zooming from a wide-angle limit to a telephoto limit or at the time of focusing from an infinity in-focus condition to a close-object in-focus condition, aberration fluctuation occurred at the time of zooming or at the time of focusing can be suppressed, and excellent optical performance can be maintained.

In the zoom lens systems according to Embodiments 1 to 6, because the first lens unit G1 is composed of at least three lens elements, chromatic aberration and spherical aberration are compensated simultaneously all over the zooming region.

In the zoom lens systems according to Embodiments 1 to 6, because each of the first lens unit G1 and the second lens unit G2 includes at least one lens element having negative optical power, chromatic aberration fluctuation occurred at the time of zooming can be suppressed, and aberration fluctuation occurred at the time of focusing can be compensated simultaneously.

In the zoom lens systems according to Embodiments 1 to 6, the aperture diaphragm A is arranged in a lens unit which is one of the at least two subsequent lens units, and a lens unit located on the object side relative to the aperture diaphragm A performs focusing from an infinity in-focus condition to a close-object in-focus condition. Therefore, aberration fluctuation due to variation from an infinity in-focus condition to a close-object in-focus condition can be sufficiently suppressed.

In the zoom lens systems according to Embodiments 1 to 4, and 6, the second lens unit G2 located on the object side relative to the aperture diaphragm A moves to the object side along the optical axis at the time of focusing from an infinity in-focus condition to a close-object in-focus condition. In the zoom lens systems according to Embodiments 1 to 4, and 6, the weight of a focusing lens unit can be reduced because the second lens unit G2 is composed of two lens elements. In addition, it is preferable that the second lens unit G2 which is the focusing lens unit is solely composed of a cemented lens element. In this case, chromatic aberration at a telephoto limit during focusing can be suitably compensated.

In the zoom lens system according to Embodiment 5, the third lens unit G3 located on the object side relative to the aperture diaphragm A moves to the image side along the optical axis at the time of focusing from an infinity in-focus condition to a close-object in-focus condition. In the zoom lens system according to Embodiment 5, excellent optical performance on a close-object in-focus condition can be maintained because the third lens unit G3 is composed of at least two lens elements. In addition, it is preferable that the third lens unit G3 which is the focusing lens unit has negative optical power. In this case, the weight and the size along a diameter of the focusing lens unit can be reduced.

In the zoom lens systems according to Embodiments 1 to 6, the aperture diaphragm A is arranged in the lens unit which is one of the at least two subsequent lens units. A lens unit located on the image side relative to the aperture diaphragm A is moved in a direction perpendicular to the optical axis in order to optically compensate image blur caused by vibration of an optical system, and thereby excellent optical performance during image blur compensation can be maintained. Specifically, in the zoom lens systems according to Embodiments 1 and 4, an entirety of the fourth lens unit G4 is moved in a direction perpendicular to the optical axis in order to optically compensate image blur. In the zoom lens systems according to Embodiments 2, 3, and 6, an entirety of the fifth lens unit G5 is moved in a direction perpendicular to the optical axis in order to optically compensate image blur. In the zoom lens system according to Embodiment 5, a part of the fifth lens unit G5 (the thirteenth lens element L13, the fourteenth lens element L14, and the fifteenth lens element L15) is moved in a direction perpendicular to the optical axis in order to optically compensate image blur.

A lens unit optically compensating image blur is an entirety of the subsequent lens unit or a sub lens unit which is a part of the subsequent lens unit. Here, in a case that a lens unit is composed of a plurality of lens elements, the sub lens unit indicates any one lens element included in the lens unit or alternatively a combination of a plurality of adjacent lens elements among the plurality of lens elements included in the lens unit.

When a lens unit having negative optical power optically compensates image blur, the lens unit optically compensating image blur can be downsized. In addition, when at least one lens unit having positive optical power or at least one lens element having positive optical power is arranged on the image side relative to the lens unit having negative optical power, excellent optical performance during image blur compensation can be maintained.

In the zoom lens systems according to Embodiments 1 to 6, because a lens unit arranged on the most image side is composed of at least three lens elements, excellent optical performance during image blur compensation can be maintained.

In the zoom lens systems according to Embodiments 1 and 4, the third lens unit G3 is, in order from the object side to the image side, composed of a first sub lens unit having negative optical power and a second sub lens unit having positive optical power. The aperture diaphragm A is arranged adjacent to the first sub lens unit. Because the aperture diaphragm A is arranged adjacent to the first sub lens unit having negative optical power, the height of an axial light beam passing through the aperture diaphragm A can be reduced. As a result, the outer diameter of a lens barrel can be reduced.

The following description is given for conditions preferred to be satisfied by a zoom lens system like the zoom lens systems according to Embodiments 1 to 6. Here, a plurality of preferable conditions are set forth for the zoom lens system according to each embodiment. A construction that satisfies all the plurality of conditions is most desirable for the zoom lens system. However, when an individual condition is satisfied, a zoom lens system having the corresponding effect is obtained.

For example, a zoom lens system like the zoom lens systems according to Embodiments 1 to 6, which has a plurality of lens units, each lens unit being composed of at least one lens element, the zoom lens system, in order from an object side to an image side, comprises a first lens unit having positive optical power; a second lens unit having positive optical power; and at least two subsequent lens units, wherein the first lens unit moves along an optical axis at the time of zooming from a wide-angle limit to a telephoto limit, an interval between the second lens unit and a lens unit which is one of the at least two subsequent lens units varies at the time of zooming or at the time of focusing from an infinity in-focus condition to a close-object in-focus condition, the first lens unit is composed of at least three lens elements, and each of the first lens unit and the second lens unit includes at least one lens element having negative optical power (this lens configuration is referred to as a basic configuration of the embodiments, hereinafter), satisfies the following conditions (1) and (2).

$$0.008 < (1/vd_{MIN}) - (1/vd_{MAX}) < 0.028 \quad (1)$$

$$0.1 < |m|/(f_T - f_W) < 0.4 \quad (2)$$

where $vd_{MIN}$ is the minimum value among Abbe numbers to the d-line of each lens element constituting the first lens unit, $vd_{MAX}$ is the maximum value among Abbe numbers to the d-line of each lens element constituting the first lens unit, m is the maximum value among the amounts of movement of each subsequent lens unit at the time of zooming from a wide-angle limit to a telephoto limit, $f_T$ is a focal length of the entire system at a telephoto limit, and $f_W$ is a focal length of the entire system at a wide-angle limit.

The condition (1) sets forth the Abbe number of each lens element constituting the first lens unit. When the condition (1) is satisfied, a compact zoom lens system can be achieved with maintaining excellent optical performance, particularly, chromatic aberration, at a low cost. When the value exceeds the upper limit of the condition (1), refractive index of each lens element constituting the first lens unit tends to become high or dispersivity of each lens element constituting the first lens unit tends to become low, which results in difficulty in lowering the cost. On the other hand, when the value goes below the lower limit of the condition (1), suitable combination consists of some lens element cannot exist in the first lens unit, which sufficiently compensates chromatic aberration. As a result, optical performance of the entire zoom lens system is lowered.

When at least one of the following conditions (1)' and (1)" is satisfied, the above-mentioned effect is achieved more successfully.

$$0.011 < (1/vd_{MIN}) - (1/vd_{MAX}) \quad (1)'$$

$$(1/vd_{MIN}) - (1/vd_{MAX}) < 0.027 \quad (1)''$$

The condition (2) sets forth the maximum amount of movement of the subsequent lens units located on the image side relative to the first lens unit having positive optical power and the second lens unit having positive optical power, from the wide-angle limit to the telephoto limit. When the condition (2) is satisfied, the amount of movement of each subsequent lens unit can be suppressed in a small amount with maintaining excellent optical performance. When the value exceeds the upper limit of the condition (2), the amount of movement of each subsequent lens unit is increased, and the overall length of zoom lens system tends to be increased. As a result, downsize of the zoom lens system becomes insufficient. On the other hand, when the value goes below the lower limit of the condition (2), the optical power of each subsequent lens unit is increased, which results in a difficulty in maintaining excellent optical performance with suppressing deterioration in performance, which is caused by manufacturing errors.

When at least one of the following conditions (2)' and (2)" is satisfied, the above-mentioned effect is achieved more successfully.

$$0.11 < |m|/(f_T - f_W) \tag{2}'$$

$$|m|/(f_T - f_W) < 0.30 \tag{2}''$$

For example, a zoom lens system having the basic configuration like the zoom lens systems according to Embodiments 1 to 6 preferably satisfies the following condition (3).

$$0.2 < f_1/f_2 < 2.0 \tag{3}$$

where
$f_1$ is a focal length of the first lens unit, and
$f_2$ is a focal length of the second lens unit.

The condition (3) sets forth the ratio of the focal length of the first lens unit to the focal length of the second lens unit. When the condition (3) is satisfied, the overall length of lens system can be reduced along with suitable compensation of spherical aberration and magnification chromatic aberration at a telephoto limit. When the value exceeds the upper limit of the condition (3), the optical power of the second lens unit is increased, which may result in a deterioration in spherical aberration and magnification chromatic aberration. On the other hand, when the value goes below the lower limit of the condition (3), the optical power of the second lens unit is decreased, which may result in an increase in the amount of movement of the second lens unit during focusing with itself. Also, the height of an incident light beam to the third lens unit is increased during focusing with itself. In both cases, it becomes difficult to downsize the lens system.

When at least one of the following conditions (3)' and (3)" is satisfied, the above-mentioned effect is achieved more successfully.

$$0.35 < f_1/f_2 \tag{3}'$$

$$f_1/f_2 < 1.80 \tag{3}''$$

For example, a zoom lens system having the basic configuration like the zoom lens systems according to Embodiments 1 to 6 preferably satisfies the following condition (4).

$$0.01 < D_{12W}/f_W < 0.45 \tag{4}$$

where
$D_{12W}$ is an axial interval between the first lens unit and the second lens unit at a wide-angle limit, and
$f_W$ is a focal length of the entire system at a wide-angle limit.

The condition (4) sets forth the overall lengths in an axial direction of the first lens unit and the second lens unit at a wide-angle limit. When the condition (4) is satisfied, the diameter of the second lens unit can be reduced with maintaining excellent optical performance. When the value exceeds the upper limit of the condition (4), the overall length of zoom lens system tends to be increased, which results in a difficulty in downsizing the zoom lens system. On the other hand, when the value goes below the lower limit of the condition (4), the second lens unit tends to grow in size, which results in an increase in the weight of a lens barrel.

When at least one of the following conditions (4)' and (4)" is satisfied, the above-mentioned effect is achieved more successfully.

$$0.015 < D_{12W}/f_W \tag{4}'$$

$$D_{12W}/f_W < 0.400 \tag{4}''$$

The individual lens units constituting the zoom lens system according to each of the embodiments may be each composed exclusively of refractive type lens elements that deflect incident light by refraction (that is, lens elements of a type in which deflection is achieved at the interface between media having different refractive indices). Alternatively the lens units may employ any one of, or a combination of at least two of: diffractive type lens elements that deflect incident light by diffraction; refractive-diffractive hybrid type lens elements that deflect incident light by a combination of diffraction and refraction; and gradient index type lens elements that deflect incident light by distribution of refractive index in the medium.

Embodiment 7

Figure 19:
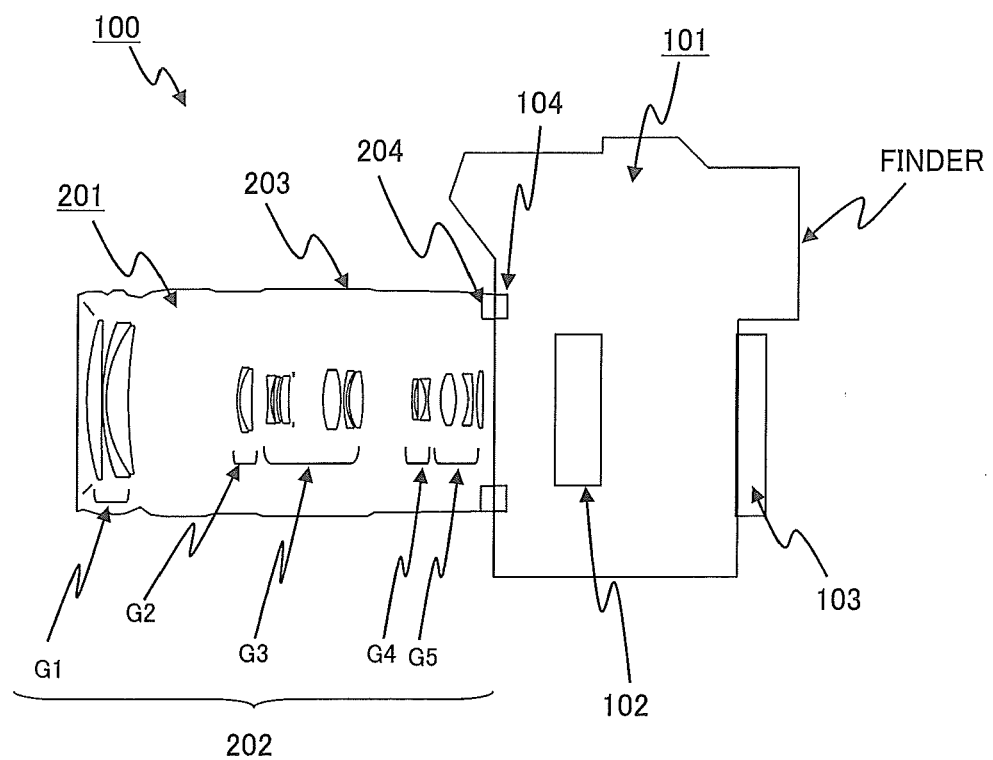
FIG. 19 is a schematic construction diagram of an interchangeable-lens type digital camera system according to Embodiment 7.

FIG. 19 is a schematic construction diagram of an interchangeable-lens type digital camera system according to Embodiment 7.

The interchangeable-lens type digital camera system (referred to simply as "camera system", hereinafter) 100 according to Embodiment 7 includes a camera body 101, and an interchangeable lens apparatus 201 which is detachably connected to the camera body 101.

The camera body 101 includes: an image sensor 102 which receives an optical image formed by a zoom lens system 202 of the interchangeable lens apparatus 201, and converts the optical image into an electric image signal; a liquid crystal monitor 103 which displays the image signal obtained by the image sensor 102; and a camera mount section 104. On the other hand, the interchangeable lens apparatus 201 includes: a zoom lens system 202 according to any of the above-mentioned Embodiments 1 to 6; a lens barrel 203 which holds the zoom lens system 202; and a lens mount section 204 connected to the camera mount section 104 of the camera body 101. The camera mount section 104 and the lens mount section 204 are physically connected to each other. Moreover, the camera mount section 104 and the lens mount section 204 function as interfaces which allow the camera body 101 and the interchangeable lens apparatus 201 to exchange signals, by electrically connecting a controller (not shown) in the camera body 101 and a controller (not shown) in the interchangeable lens apparatus 201. In FIG. 19, the zoom lens system according to Embodiment 1 is employed as the zoom lens system 202.

In Embodiment 7, the zoom lens system 202 according to any of Embodiments 1 to 6 is employed. Accordingly, a compact interchangeable lens apparatus having excellent imaging performance can be realized at low cost. Moreover, size reduction and cost reduction of the entire camera system 100 according to Embodiment 7 can be achieved.

Numerical examples are described below in which the zoom lens systems according to the embodiments are implemented. As described below, Numerical Examples 1, 2, 3, 4, 5, and 6 correspond to Embodiments 1, 2, 3, 4, 5, and 6, respectively. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line.

FIGS. 2, 5, 8, 11, 14, and 17 are longitudinal aberration diagrams of an infinity in-focus condition of the zoom lens systems according to Numerical Examples 1, 2, 3, 4, 5, and 6, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9, 12, 15, and 18 are lateral aberration diagrams of the zoom lens systems according to Numerical Examples 1, 2, 3, 4, 5, and 6, respectively, at a telephoto limit in a basic state where image blur compensation is not performed and in an image blur compensation state.

In each lateral aberration diagram, the aberration diagrams in the upper three parts correspond to a basic state where image blur compensation is not performed at a telephoto limit, while the aberration diagrams in the lower three parts correspond to an image blur compensation state where the entirety of the fourth lens unit G4 (Numerical Examples 1 and 4), or the entirety of the fifth lens unit G5 (Numerical Examples 2, 3, and 6), or a part of the fifth lens unit G5 (Numerical Example 5: the thirteenth lens element L13, the fourteenth lens element L14, and the fifteenth lens element L15) is moved by a predetermined amount in a direction perpendicular to the optical axis at a telephoto limit. Among the lateral aberration diagrams of a basic state, the upper part shows the lateral aberration at an image point of 70% of the maximum image height, the middle part shows the lateral aberration at the axial image point, and the lower part shows the lateral aberration at an image point of −70% of the maximum image height. Among the lateral aberration diagrams of an image blur compensation state, the upper part shows the lateral aberration at an image point of 70% of the maximum image height, the middle part shows the lateral aberration at the axial image point, and the lower part shows the lateral aberration at an image point of −70% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1.

In the zoom lens system according to each of the numerical examples, the amount of movement ($Y_T$: mm) of the image blur compensating lens unit (the entirety of the fourth lens unit G4, or the entirety of the fifth lens unit G5, or a part of the fifth lens unit G5) in a direction perpendicular to the optical axis in the image blur compensation state at a telephoto limit is as shown in Table 1. The image blur compensation angle is 0.3°. That is, the following amount of movement of the image blur compensating lens unit is equal to the amount of image decentering in a case that the optical axis of the zoom lens system inclines by 0.3°.

TABLE 1

| (Amount of movement of image blur compensating lens unit) | |
|---|---|
| Numerical example | Amount of movement ($Y_T$: mm) |
| 1 | 0.388 |
| 2 | 0.488 |
| 3 | 0.413 |
| 4 | 0.454 |
| 5 | 0.487 |
| 6 | 0.485 |

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Example 1

Figure 1:
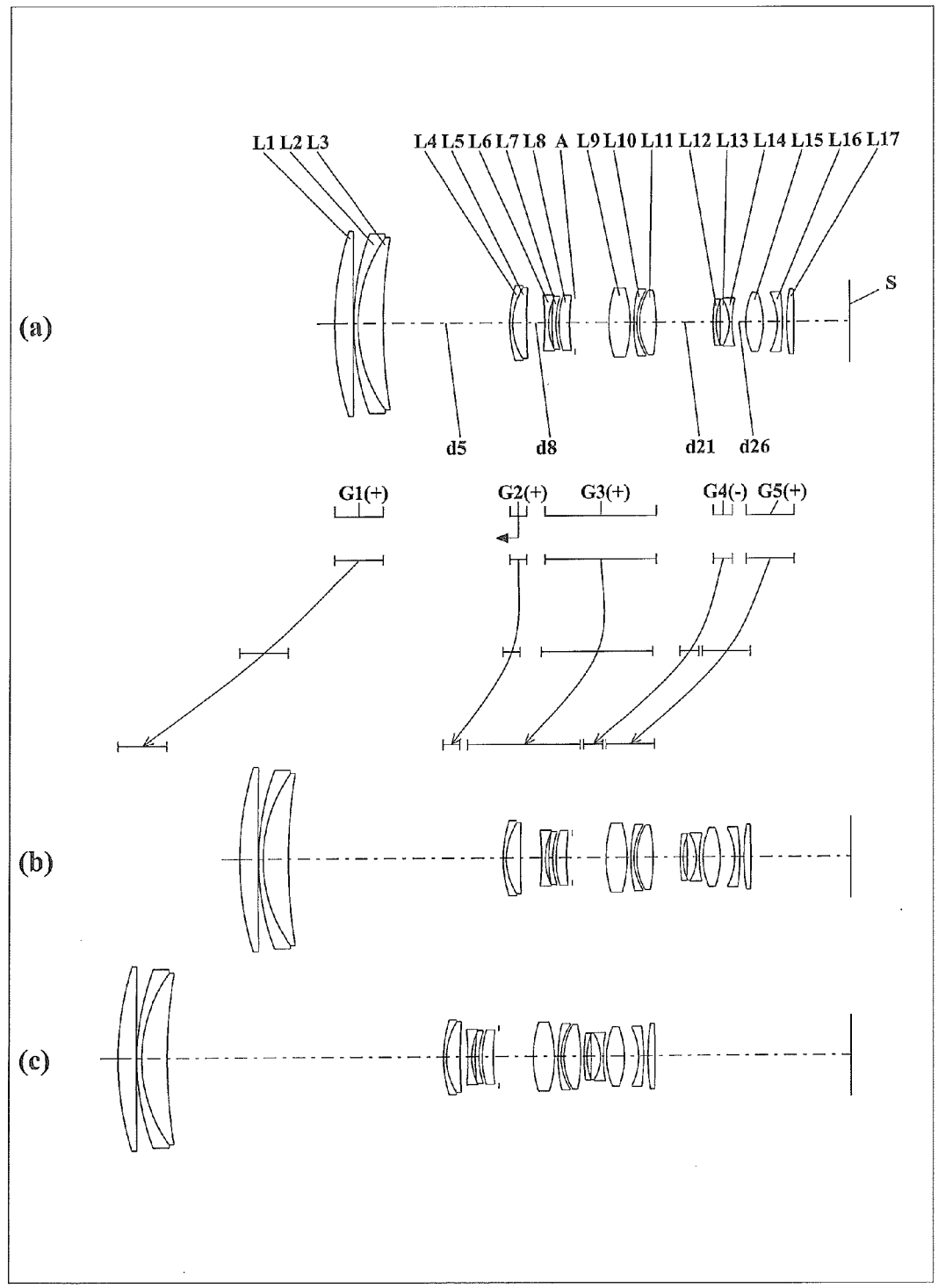
FIG. 1 is a lens arrangement diagram showing an infinity in-focus condition of a zoom lens system according to Embodiment 1 (Example 1)
Figure 2:
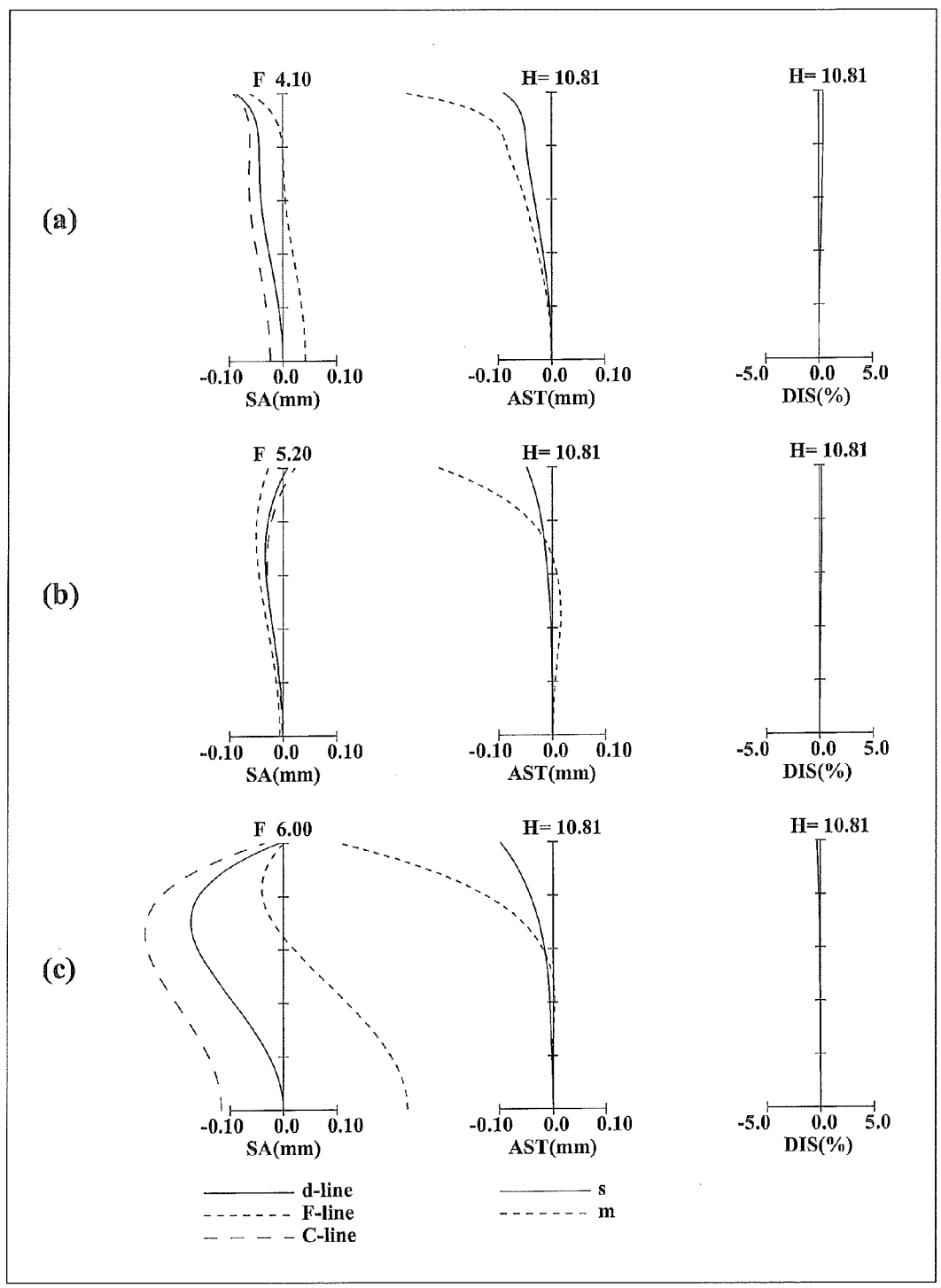
FIG. 2 is a longitudinal aberration diagram of an infinity in-focus condition of a zoom lens system according to Example 1.
Figure 3:
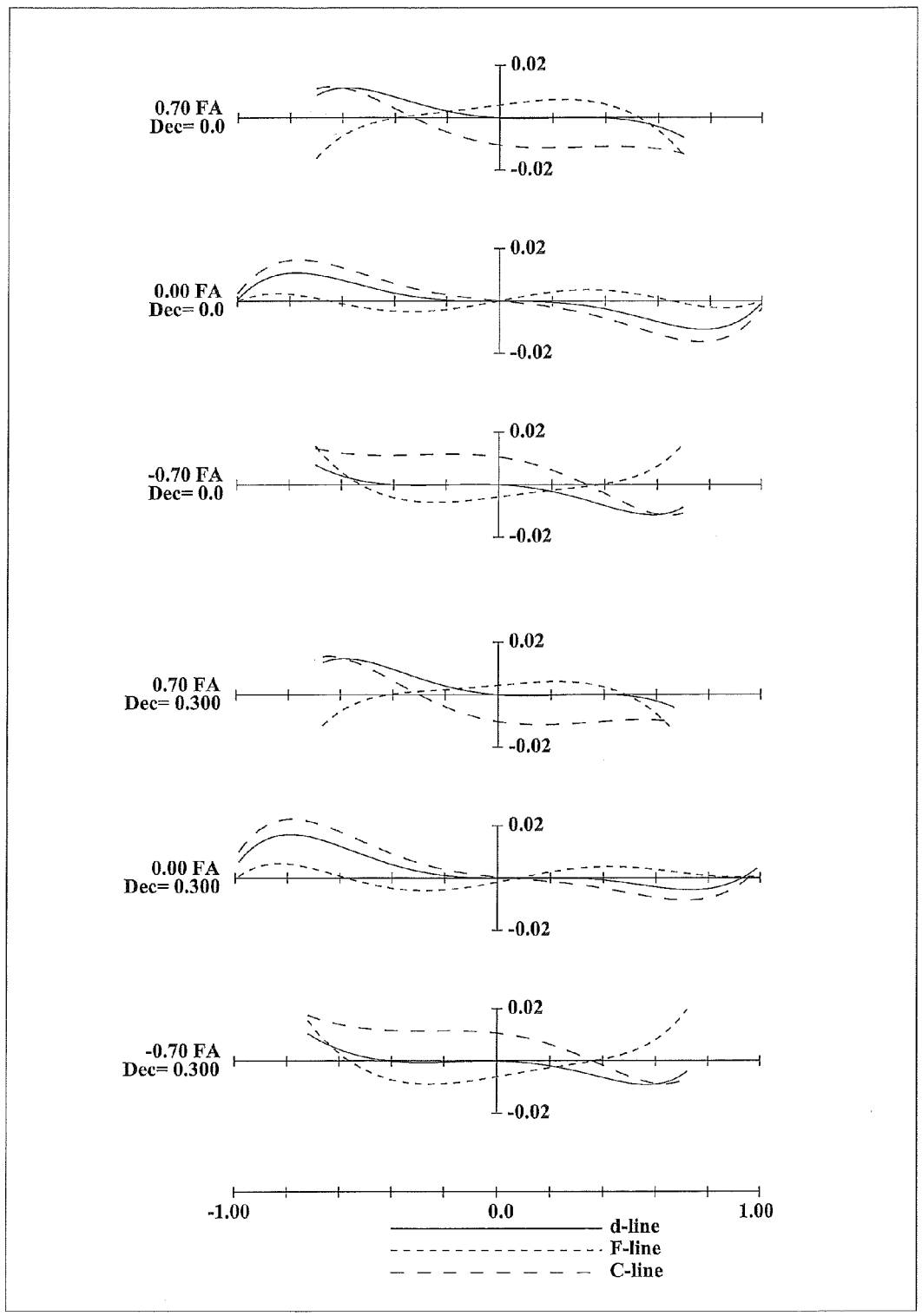
FIG. 3 is a lateral aberration diagram of a zoom lens system according to Example 1 at a telephoto limit in a basic state where image blur compensation is not performed and in an image blur compensation state.

The zoom lens system of Numerical Example 1 corresponds to Embodiment 1 shown in FIG. 1. Table 2 shows the surface data of the zoom lens system of Numerical Example 1. Table 3 shows the various data. Table 4 shows the single lens data. Table 5 shows the zoom lens unit data. Table 6 shows the magnification of zoom lens unit.

TABLE 2

| (Surface data) | | | | |
|---|---|---|---|---|
| Surface number | r | d | nd | vd |
| Object surface | ∞ | | | |
| 1 | 88.59110 | 5.00000 | 1.49700 | 81.6 |
| 2 | 1866.97590 | 0.20000 | | |
| 3 | 71.36140 | 1.29530 | 1.66998 | 39.2 |
| 4 | 41.72250 | 7.00000 | 1.49700 | 81.6 |
| 5 | 148.20930 | Variable | | |
| 6 | 35.18610 | 0.80000 | 1.62000 | 62.2 |
| 7 | 18.26820 | 3.88740 | 1.52250 | 62.2 |
| 8 | 184.95110 | Variable | | |
| 9 | −82.78480 | 1.03710 | 1.70154 | 41.1 |
| 10 | 17.70680 | 0.91740 | | |
| 11 | 47.86680 | 1.04450 | 1.78590 | 43.9 |
| 12 | 23.07600 | 0.89790 | | |
| 13 | 26.27740 | 3.00370 | 1.94595 | 18.0 |
| 14 | 60.01060 | 1.57280 | | |
| 15(Diaphragm) | ∞ | 9.48520 | | |
| 16 | 32.28200 | 5.78690 | 1.49700 | 81.6 |
| 17 | −33.45180 | 1.01010 | | |
| 18 | 38.31890 | 0.84680 | 1.68893 | 31.2 |
| 19 | 16.33610 | 0.85900 | | |
| 20 | 17.93360 | 4.66210 | 1.49700 | 81.6 |

TABLE 2-continued (Surface data)

| Surface number | r | d | nd | vd |
|---|---|---|---|---|
| 21 | −48.79300 | Variable | | |
| 22 | 50.53120 | 0.80000 | 1.78590 | 43.9 |
| 23 | 17.44800 | 1.16950 | | |
| 24 | −99.37330 | 2.54170 | 1.75520 | 27.5 |
| 25 | −12.40490 | 0.80000 | 1.72916 | 54.7 |
| 26 | 32.07160 | Variable | | |
| 27 | 20.49290 | 4.86940 | 1.49700 | 81.6 |
| 28 | −24.44280 | 4.02370 | | |
| 29 | −17.47130 | 1.42870 | 1.91082 | 35.2 |
| 30 | −62.44800 | 1.15690 | | |
| 31 | 52.68520 | 2.01160 | 1.67270 | 32.2 |
| 32 | −297.69020 | (BF) | | |
| Image surface | ∞ | | | |

TABLE 3

(Various data)
Zooming ratio 2.82511

| | Wide-angle limit | Middle position | Telephoto limit |
|---|---|---|---|
| Focal length | 102.9984 | 173.1202 | 290.9816 |
| F-number | 4.10018 | 5.20030 | 5.99506 |
| View angle | 5.9684 | 3.5679 | 2.1348 |
| Image height | 10.8150 | 10.8150 | 10.8150 |
| Overall length of lens system | 143.4670 | 170.0081 | 203.6243 |
| BF | 15.57395 | 27.83342 | 54.71859 |
| d5 | 34.9732 | 59.6221 | 76.7868 |
| d8 | 5.0923 | 5.9614 | 2.0474 |
| d21 | 15.9004 | 7.4883 | 0.9727 |
| d26 | 3.8195 | 0.9952 | 0.9911 |
| Entrance pupil position | 110.1837 | 244.8457 | 374.9426 |
| Exit pupil position | −41.2950 | −32.3185 | −31.1752 |
| Front principal points position | 26.6361 | −80.2824 | −319.8311 |
| Back principal points position | 40.4686 | −3.1121 | −87.3573 |

TABLE 4

(Single lens data)

| Lens element | Initial surface number | Focal length |
|---|---|---|
| 1 | 1 | 186.9579 |
| 2 | 3 | −152.6133 |
| 3 | 4 | 114.3457 |
| 4 | 6 | −62.4109 |
| 5 | 7 | 38.4868 |
| 6 | 9 | −20.7044 |
| 7 | 11 | −57.7652 |
| 8 | 13 | 47.3679 |
| 9 | 16 | 34.0502 |
| 10 | 18 | −41.9935 |
| 11 | 20 | 27.0125 |
| 12 | 22 | −34.2751 |
| 13 | 24 | 18.5358 |
| 14 | 25 | −12.1753 |
| 15 | 27 | 23.2660 |
| 16 | 29 | −27.0427 |
| 17 | 31 | 66.6963 |

TABLE 5

(Zoom lens unit data)

| Lens unit | Initial surface No. | Focal length | Overall length of lens unit | Front principal points position | Back principal points position |
|---|---|---|---|---|---|
| 1 | 1 | 134.22129 | 13.49530 | −2.05113 | 2.71028 |
| 2 | 6 | 103.96687 | 4.68740 | −1.17097 | 0.50963 |
| 3 | 9 | 32.24658 | 31.12350 | 26.09266 | 53.94582 |
| 4 | 22 | −16.76487 | 5.31120 | 1.81337 | 3.68891 |
| 5 | 27 | 38.87820 | 13.49030 | −1.53578 | 1.78745 |

TABLE 6

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 0.53702 | 0.61536 | 0.68495 |
| 3 | 9 | 0.71629 | 0.89563 | 0.98663 |
| 4 | 22 | 6.68540 | −138.26104 | −4.52814 |
| 5 | 27 | 0.29840 | −0.01693 | −0.70845 |

Numerical Example 2

Figure 4:
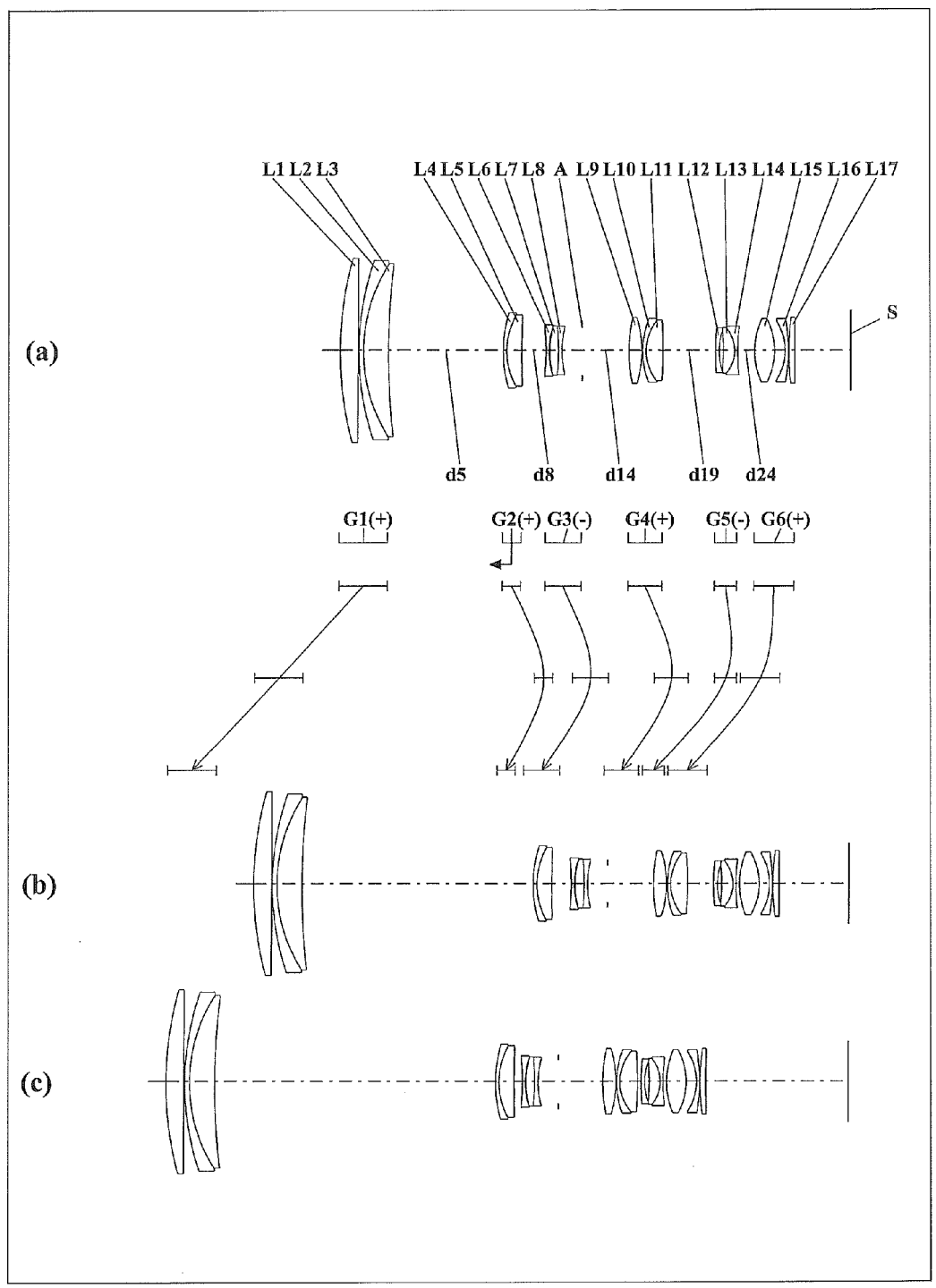
FIG. 4 is a lens arrangement diagram showing an infinity in-focus condition of a zoom lens system according to Embodiment 2 (Example 2)
Figure 5:
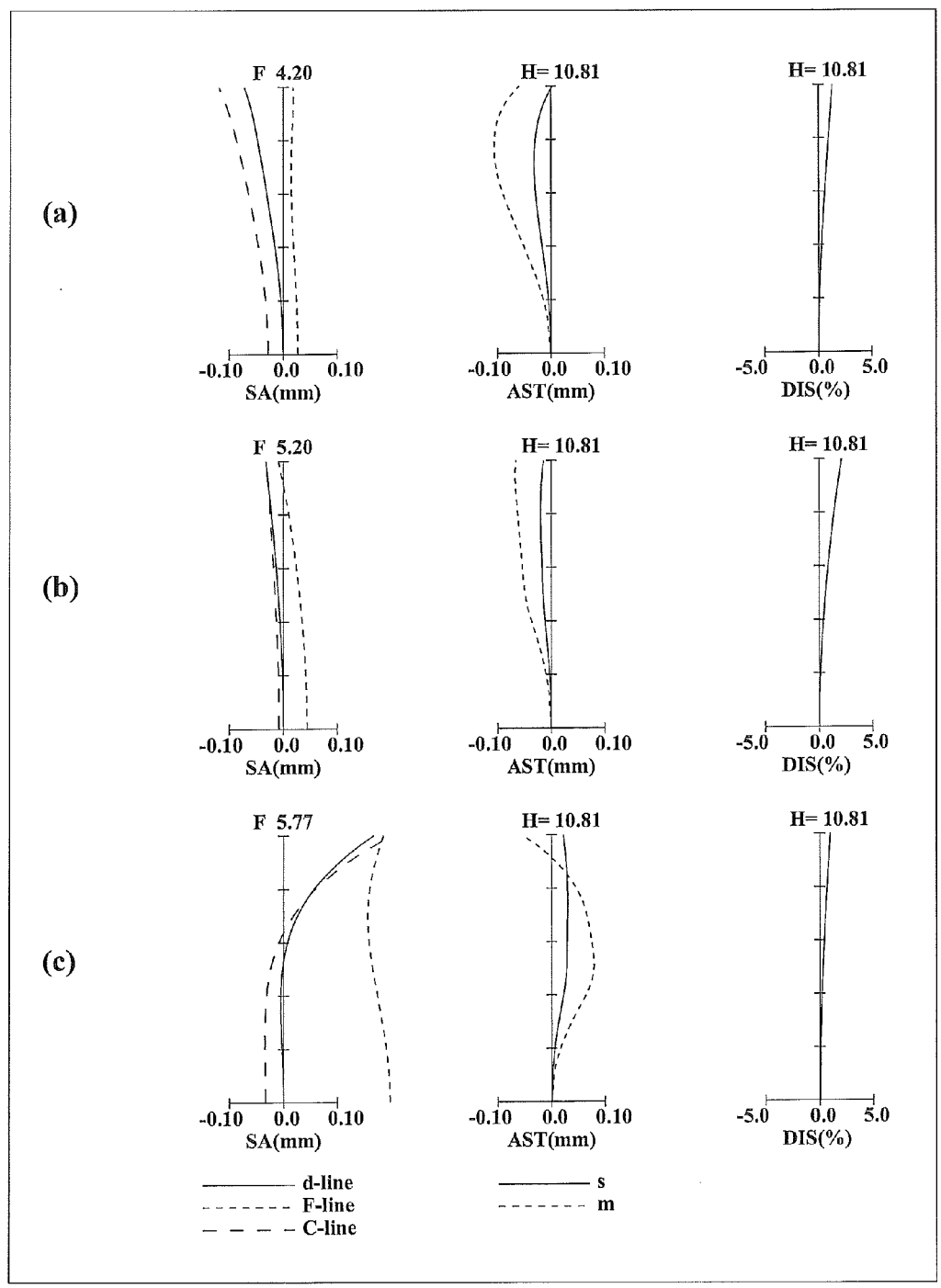
FIG. 5 is a longitudinal aberration diagram showing an infinity in-focus condition of a zoom lens system according to Example 2.
Figure 6:
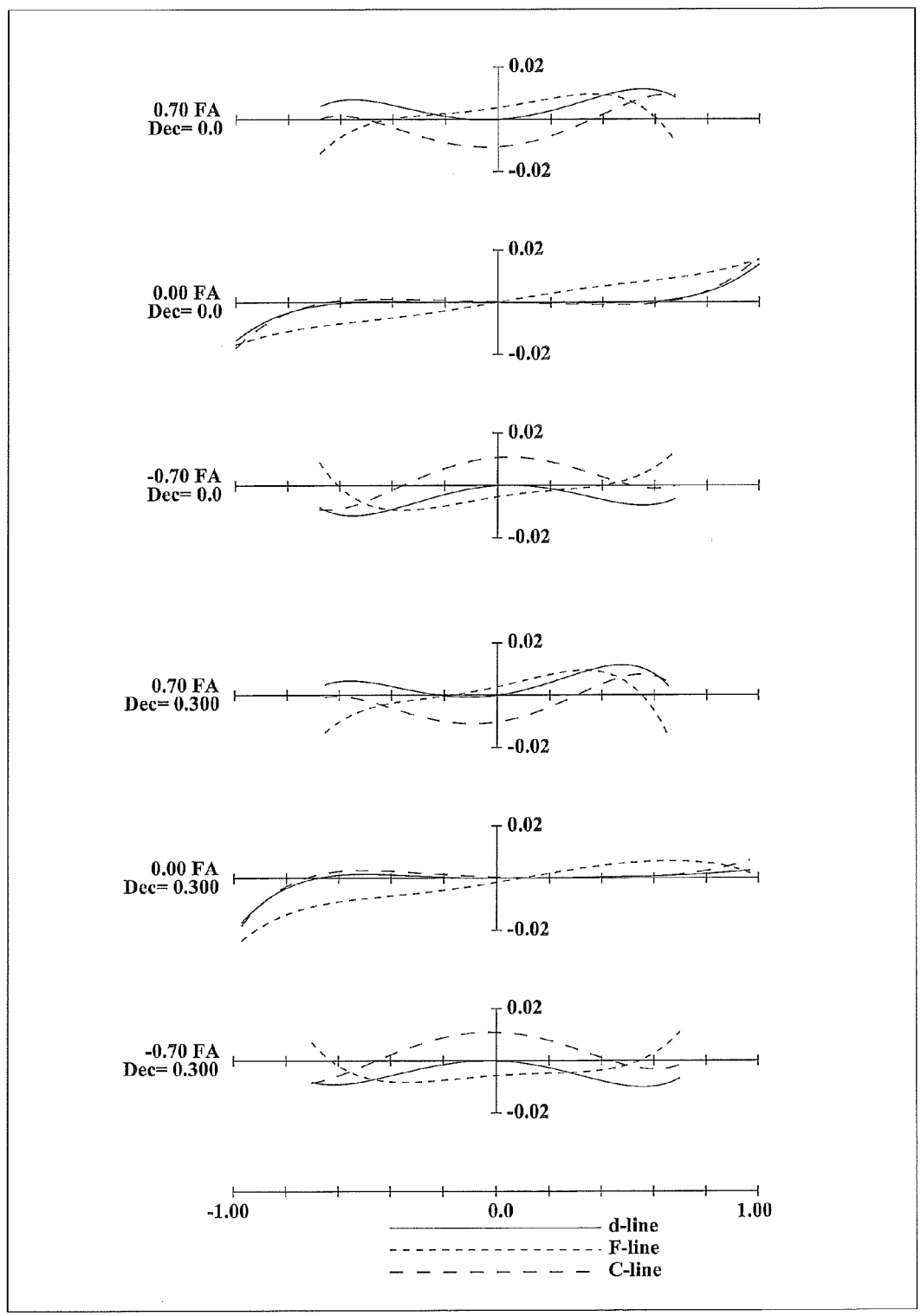
FIG. 6 is a lateral aberration diagram of a zoom lens system according to Example 2 at a telephoto limit in a basic state where image blur compensation is not performed and in an image blur compensation state.

The zoom lens system of Numerical Example 2 corresponds to Embodiment 2 shown in FIG. 4. Table 7 shows the surface data of the zoom lens system of Numerical Example 2. Table 8 shows the various data. Table 9 shows the single lens data. Table 10 shows the zoom lens unit data. Table 11 shows the magnification of zoom lens unit.

TABLE 7

(Surface data)

| Surface number | r | d | nd | vd |
|---|---|---|---|---|
| Object surface | ∞ | | | |
| 1 | 97.48620 | 5.00000 | 1.49700 | 81.6 |
| 2 | ∞ | 0.20000 | | |
| 3 | 77.32930 | 1.31480 | 1.66446 | 35.9 |
| 4 | 45.14500 | 7.00000 | 1.49700 | 81.6 |
| 5 | 207.52010 | Variable | | |
| 6 | 36.71200 | 0.96400 | 1.60342 | 38.0 |
| 7 | 21.07020 | 4.11480 | 1.51680 | 64.2 |
| 8 | 349.90360 | Variable | | |
| 9 | −64.61530 | 0.80000 | 1.72342 | 38.0 |
| 10 | 20.38860 | 0.30210 | | |
| 11 | 28.47690 | 2.35310 | 1.94595 | 18.0 |
| 12 | −71.05400 | 0.92410 | 1.90366 | 31.3 |
| 13 | 26.11680 | 5.60180 | | |
| 14(Diaphragm) | ∞ | Variable | | |
| 15 | 46.66740 | 3.66870 | 1.49700 | 81.6 |
| 16 | −29.85860 | 0.24480 | | |
| 17 | 25.81340 | 0.87370 | 1.68893 | 31.2 |
| 18 | 13.27750 | 4.86230 | 1.49700 | 81.6 |
| 19 | −126.19620 | Variable | | |
| 20 | 68.09150 | 1.03310 | 1.85135 | 40.1 |
| 21 | 17.59550 | 1.17370 | | |
| 22 | −68.85140 | 3.17570 | 1.72825 | 28.3 |
| 23 | −9.75440 | 0.80000 | 1.72916 | 54.7 |
| 24 | 54.31160 | Variable | | |
| 25 | 22.94740 | 5.54150 | 1.51680 | 64.2 |
| 26 | −18.30460 | 2.84240 | | |
| 27 | −15.81260 | 0.80000 | 1.91082 | 35.2 |
| 28 | −59.08150 | 0.20000 | | |
| 29 | 67.13100 | 1.72410 | 1.72342 | 38.0 |
| 30 | 1427.73440 | (BF) | | |
| Image surface | ∞ | | | |

TABLE 8

(Various data)
Zooming ratio 2.82511

|  | Wide-angle limit | Middle position | Telephoto limit |
|---|---|---|---|
| Focal length | 103.0004 | 173.1370 | 290.9875 |
| F-number | 4.19521 | 5.20078 | 5.77104 |
| View angle | 5.9176 | 3.5000 | 2.1078 |
| Image height | 10.8150 | 10.8150 | 10.8150 |
| Overall length of lens system | 142.3499 | 165.7428 | 189.8122 |
| BF | 15.54266 | 19.31796 | 39.55235 |
| d5 | 31.8494 | 64.2689 | 78.0862 |
| d8 | 6.7064 | 5.4465 | 2.3430 |
| d14 | 13.0704 | 12.8671 | 12.2986 |
| d19 | 14.7790 | 7.3453 | 1.0405 |
| d24 | 4.8873 | 0.9823 | 0.9769 |
| Entrance pupil position | 117.9831 | 322.9090 | 478.2746 |
| Exit pupil position | −37.9696 | −27.9715 | −26.7394 |
| Front principal points position | 22.7281 | −137.8466 | −508.0266 |
| Back principal points position | 39.3494 | −7.3942 | −101.1753 |

TABLE 9

(Single lens data)

| Lens element | Initial surface number | Focal length |
|---|---|---|
| 1 | 1 | 196.1504 |
| 2 | 3 | −165.9525 |
| 3 | 4 | 114.4523 |
| 4 | 6 | −83.8999 |
| 5 | 7 | 43.1989 |
| 6 | 9 | −21.3394 |
| 7 | 11 | 21.7409 |
| 8 | 12 | −21.0384 |
| 9 | 15 | 37.2296 |
| 10 | 17 | −40.8467 |
| 11 | 18 | 24.4552 |
| 12 | 20 | −28.1343 |
| 13 | 22 | 15.2596 |
| 14 | 23 | −11.2814 |
| 15 | 25 | 20.6478 |
| 16 | 27 | −23.9160 |
| 17 | 29 | 97.3239 |

TABLE 10

(Zoom lens unit data)

| Lens unit | Initial surface No. | Focal length | Overall length of lens unit | Front principal points position | Back principal points position |
|---|---|---|---|---|---|
| 1 | 1 | 129.56758 | 13.51480 | −0.89451 | 3.77314 |
| 2 | 6 | 91.29683 | 5.07880 | −0.67343 | 1.11387 |
| 3 | 9 | −20.65818 | 9.98110 | 1.53790 | 3.53052 |
| 4 | 15 | 23.64613 | 9.64950 | 2.15953 | 5.23041 |
| 5 | 20 | −16.14958 | 6.18250 | 1.64666 | 3.89377 |
| 6 | 25 | 42.59289 | 11.10800 | −3.38639 | 0.52906 |

TABLE 11

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 0.50735 | 0.61885 | 0.68280 |
| 3 | 9 | −1.70594 | −6.47479 | −45.34317 |
| 4 | 15 | −0.43843 | −0.15531 | −0.02477 |
| 5 | 20 | 5.41727 | 7.20348 | −16.54653 |
| 6 | 25 | 0.38671 | 0.29808 | −0.17699 |

Numerical Example 3

Figure 7:
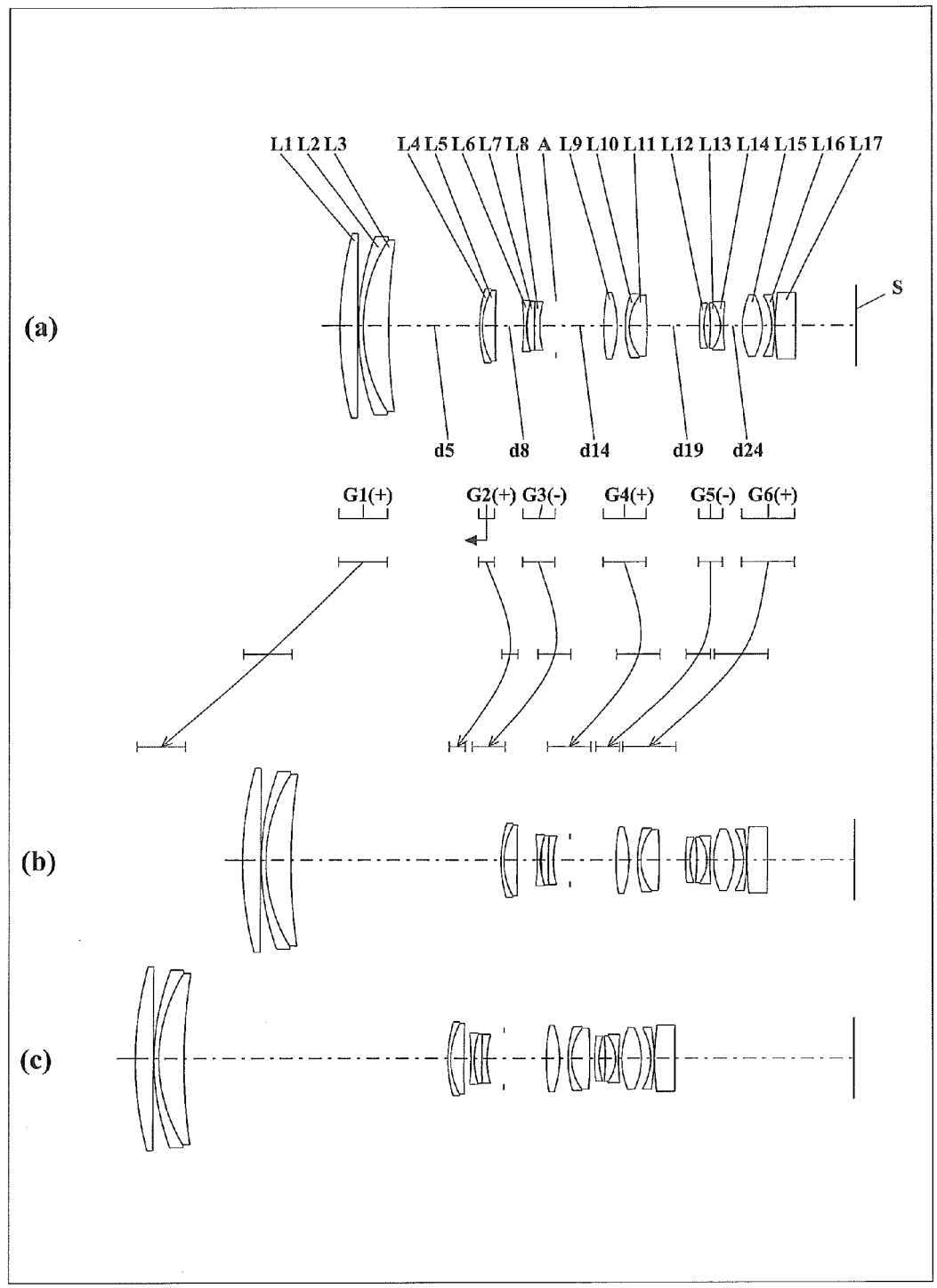
FIG. 7 is a lens arrangement diagram showing an infinity in-focus condition of a zoom lens system according to Embodiment 3 (Example 3)
Figure 8:
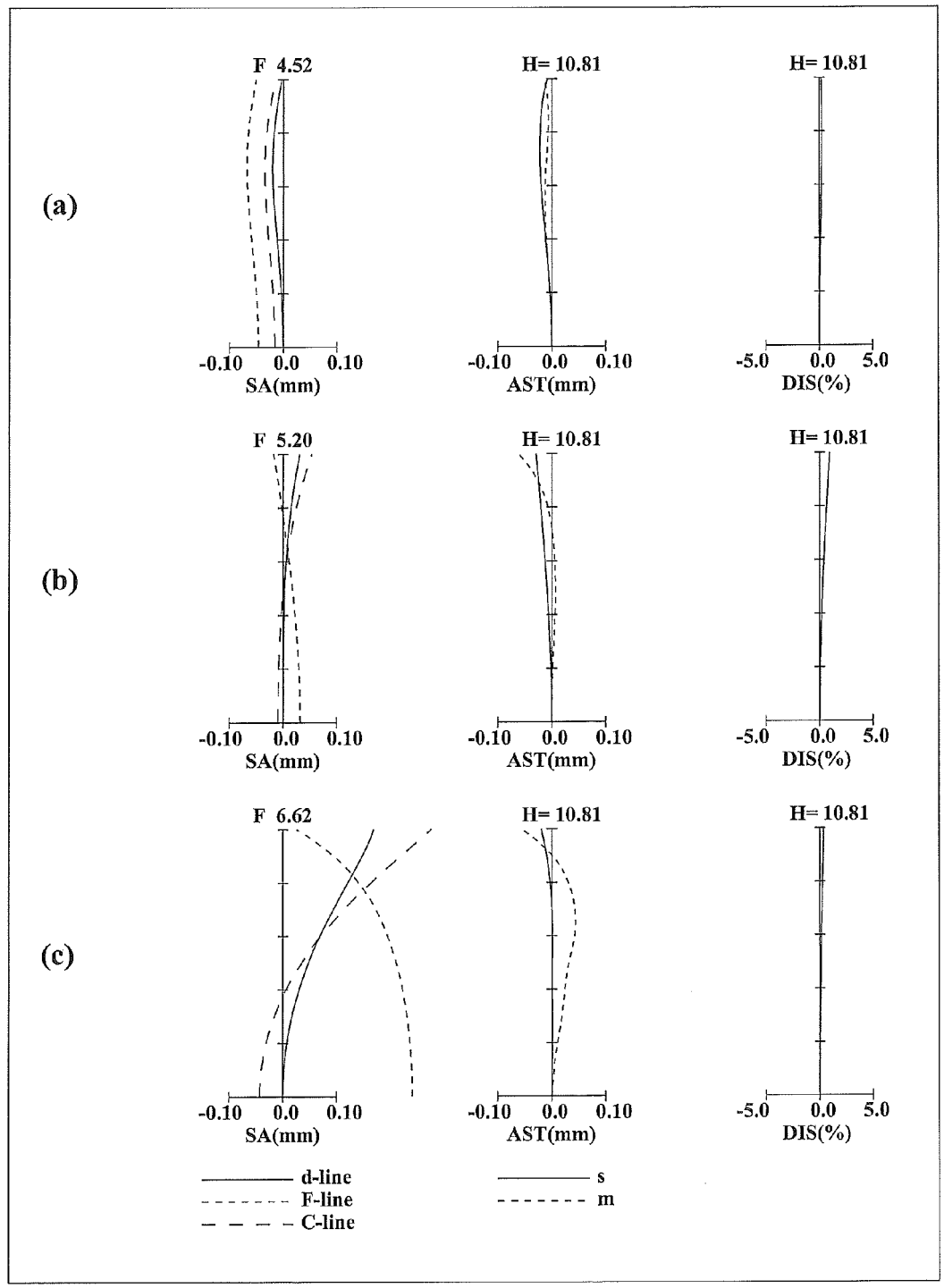
FIG. 8 is a longitudinal aberration diagram showing an infinity in-focus condition of a zoom lens system according to Example 3.
Figure 9:
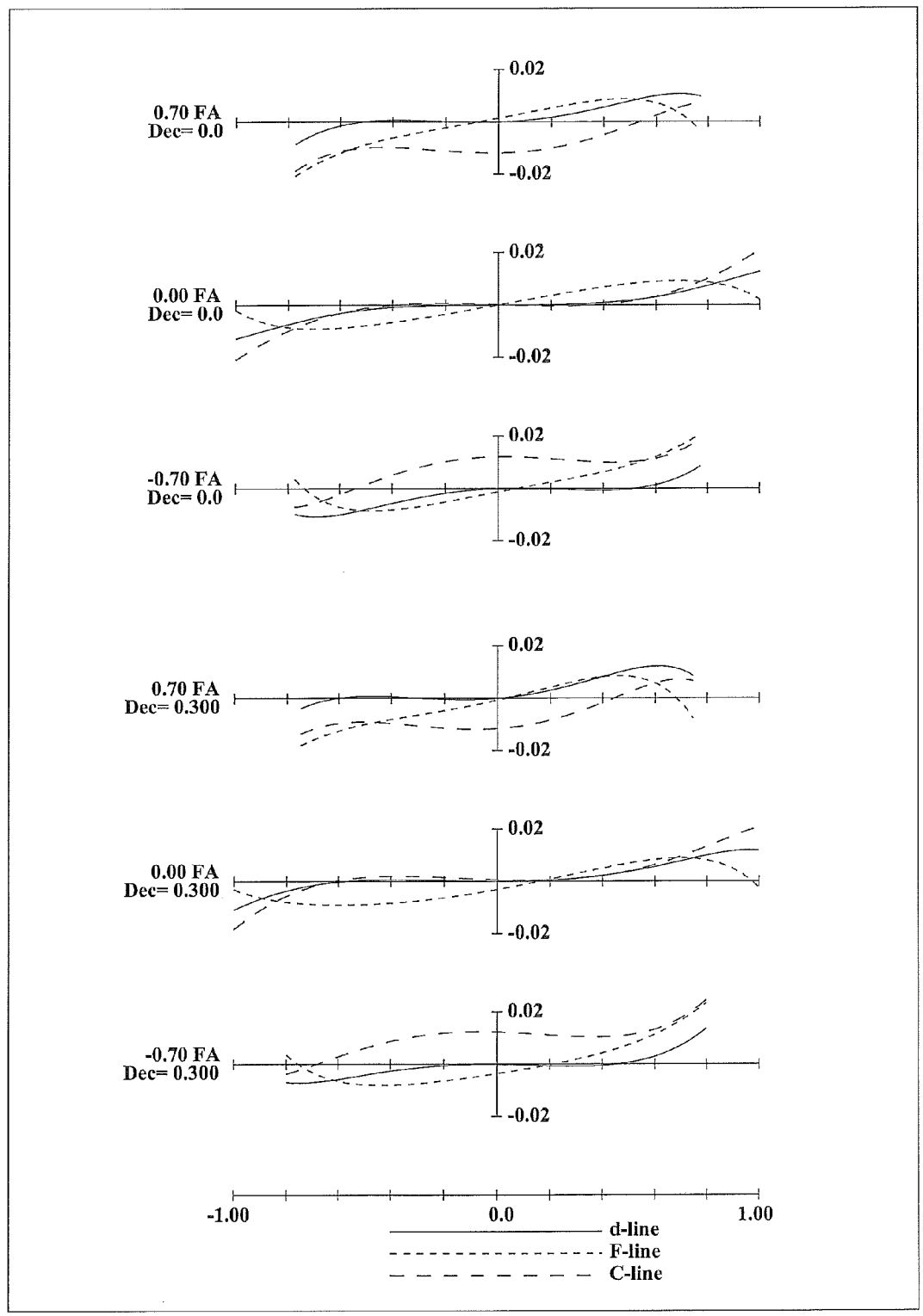
FIG. 9 is a lateral aberration diagram of a zoom lens system according to Example 3 at a telephoto limit in a basic state where image blur compensation is not performed and in an image blur compensation state.

The zoom lens system of Numerical Example 3 corresponds to Embodiment 3 shown in FIG. 7. Table 12 shows the surface data of the zoom lens system of Numerical Example 3. Table 13 shows the various data. Table 14 shows the single lens data. Table 15 shows the zoom lens unit data. Table 16 shows the magnification of zoom lens unit.

TABLE 12

(Surface data)

| Surface number | r | d | nd | vd |
|---|---|---|---|---|
| Object surface | ∞ | | | |
| 1 | 99.04270 | 5.00000 | 1.55115 | 49.5 |
| 2 | ∞ | 0.20000 | | |
| 3 | 70.81440 | 1.31620 | 1.76182 | 26.6 |
| 4 | 45.51740 | 7.00000 | 1.49700 | 81.6 |
| 5 | 163.76370 | Variable | | |
| 6 | 36.65590 | 0.80000 | 1.60717 | 40.4 |
| 7 | 21.10340 | 3.54720 | 1.49700 | 81.6 |
| 8 | 343.52210 | Variable | | |
| 9 | −66.07940 | 0.80000 | 1.71300 | 53.9 |
| 10 | 19.76140 | 0.26690 | | |
| 11 | 26.08220 | 2.01900 | 1.94595 | 18.0 |
| 12 | 199.13930 | 1.45690 | 1.89800 | 34.0 |
| 13 | 25.62540 | 4.61300 | | |
| 14(Diaphragm) | ∞ | Variable | | |
| 15 | 50.32070 | 3.73150 | 1.49700 | 81.6 |
| 16 | −29.17550 | 2.28460 | | |
| 17 | 27.88690 | 1.09860 | 1.68893 | 31.1 |
| 18 | 13.92340 | 5.02680 | 1.49700 | 81.6 |
| 19 | −111.43760 | Variable | | |
| 20 | 64.71150 | 1.24280 | 1.85280 | 39.0 |
| 21 | 18.01730 | 1.82530 | | |
| 22 | −69.05960 | 2.85450 | 1.74077 | 27.8 |
| 23 | −10.67440 | 0.80000 | 1.72600 | 53.4 |
| 24 | 54.96110 | Variable | | |
| 25 | 22.95110 | 5.46640 | 1.51835 | 60.4 |
| 26 | −18.93900 | 2.64800 | | |
| 27 | −16.63950 | 0.80000 | 1.91082 | 35.2 |
| 28 | −62.67760 | 0.20000 | | |
| 29 | 71.35330 | 5.62350 | 1.74330 | 49.2 |
| 30 | 2108.11490 | (BF) | | |
| Image surface | ∞ | | | |

TABLE 13

(Various data)
Zooming ratio 2.76690

|  | Wide-angle limit | Middle position | Telephoto limit |
|---|---|---|---|
| Focal length | 102.9992 | 171.3306 | 284.9883 |
| F-number | 4.51811 | 5.20034 | 6.61857 |
| View angle | 5.9843 | 3.5778 | 2.1658 |
| Image height | 10.8150 | 10.8150 | 10.8150 |
| Overall length | 143.7112 | 170.0520 | 199.5460 |

TABLE 13-continued (Various data)
Zooming ratio 2.76690

|  | Wide-angle limit | Middle position | Telephoto limit |
|---|---|---|---|
| of lens system | | | |
| BF | 16.96438 | 24.28567 | 49.70381 |
| d5 | 25.1652 | 58.0953 | 73.1492 |
| d8 | 7.8005 | 5.7174 | 1.9466 |
| d14 | 13.4144 | 12.8340 | 11.7692 |
| d19 | 14.4775 | 7.3193 | 1.3583 |
| d24 | 5.2680 | 1.1791 | 0.9977 |
| Entrance pupil position | 96.0912 | 250.4370 | 362.5095 |
| Exit pupil position | −45.8128 | −33.3555 | −31.2093 |
| Front principal points position | 30.0986 | −87.4894 | −356.2745 |
| Back principal points position | 40.7120 | −1.2787 | −85.4423 |

TABLE 14

(Single lens data)

| Lens element | Initial surface number | Focal length |
|---|---|---|
| 1 | 1 | 179.7016 |
| 2 | 3 | −171.1043 |
| 3 | 4 | 124.3944 |
| 4 | 6 | −83.5426 |
| 5 | 7 | 45.0764 |
| 6 | 9 | −21.2529 |
| 7 | 11 | 31.5493 |
| 8 | 12 | −32.8812 |
| 9 | 15 | 37.7473 |
| 10 | 17 | −41.7007 |
| 11 | 18 | 25.2395 |
| 12 | 20 | −29.6425 |
| 13 | 22 | 16.6970 |
| 14 | 23 | −12.2491 |
| 15 | 25 | 20.9516 |
| 16 | 27 | −25.0793 |
| 17 | 29 | 99.2415 |

TABLE 15

(Zoom lens unit data)

| Lens unit | Initial surface No. | Focal length | Overall length of lens unit | Front principal points position | Back principal points position |
|---|---|---|---|---|---|
| 1 | 1 | 130.05742 | 13.51620 | −1.80242 | 3.09866 |
| 2 | 6 | 100.09360 | 4.34720 | −0.67623 | 0.82132 |
| 3 | 9 | −21.41227 | 9.15580 | 1.69183 | 3.76976 |
| 4 | 15 | 24.80971 | 12.14150 | 3.05215 | 6.16094 |
| 5 | 20 | −17.06015 | 6.72260 | 1.98468 | 4.21952 |
| 6 | 25 | 42.02028 | 14.73790 | −2.86586 | 2.54081 |

TABLE 16

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 0.51266 | 0.61666 | 0.67970 |
| 3 | 9 | −1.49221 | −3.55567 | −6.14770 |
| 4 | 15 | −0.49219 | −0.26391 | −0.16713 |

TABLE 16-continued (Magnification of zoom lens unit)

| Lens unit | Initial surface No. | Wide-angle limit | Middle position | Telephoto limit |
|---|---|---|---|---|
| 5 | 20 | 6.87332 | 17.27525 | −6.63186 |
| 6 | 25 | 0.30601 | 0.13178 | −0.47312 |

Numerical Example 4

Figure 10:
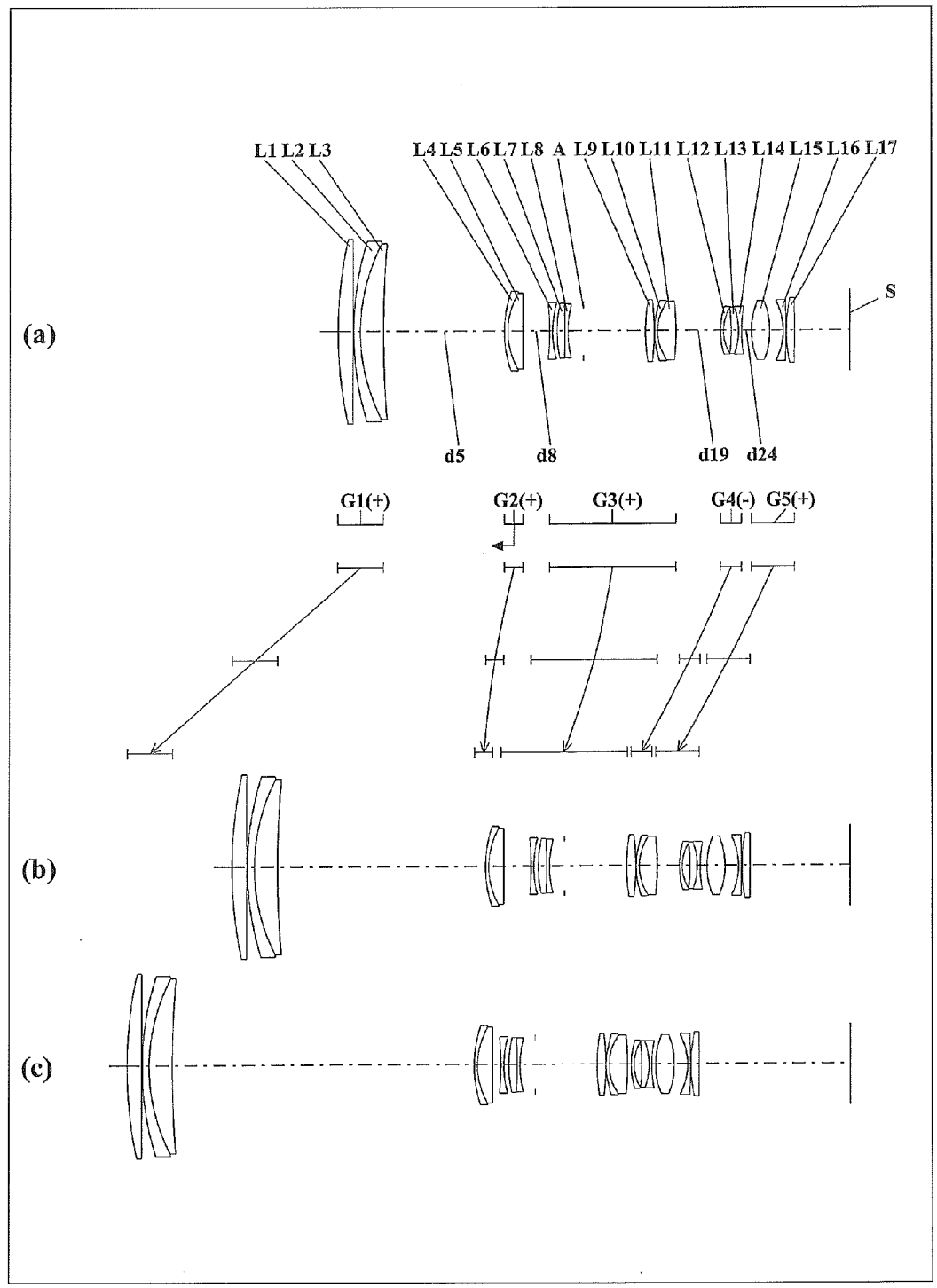
FIG. 10 is a lens arrangement diagram showing an infinity in-focus condition of a zoom lens system according to Embodiment 4 (Example 4)
Figure 11:
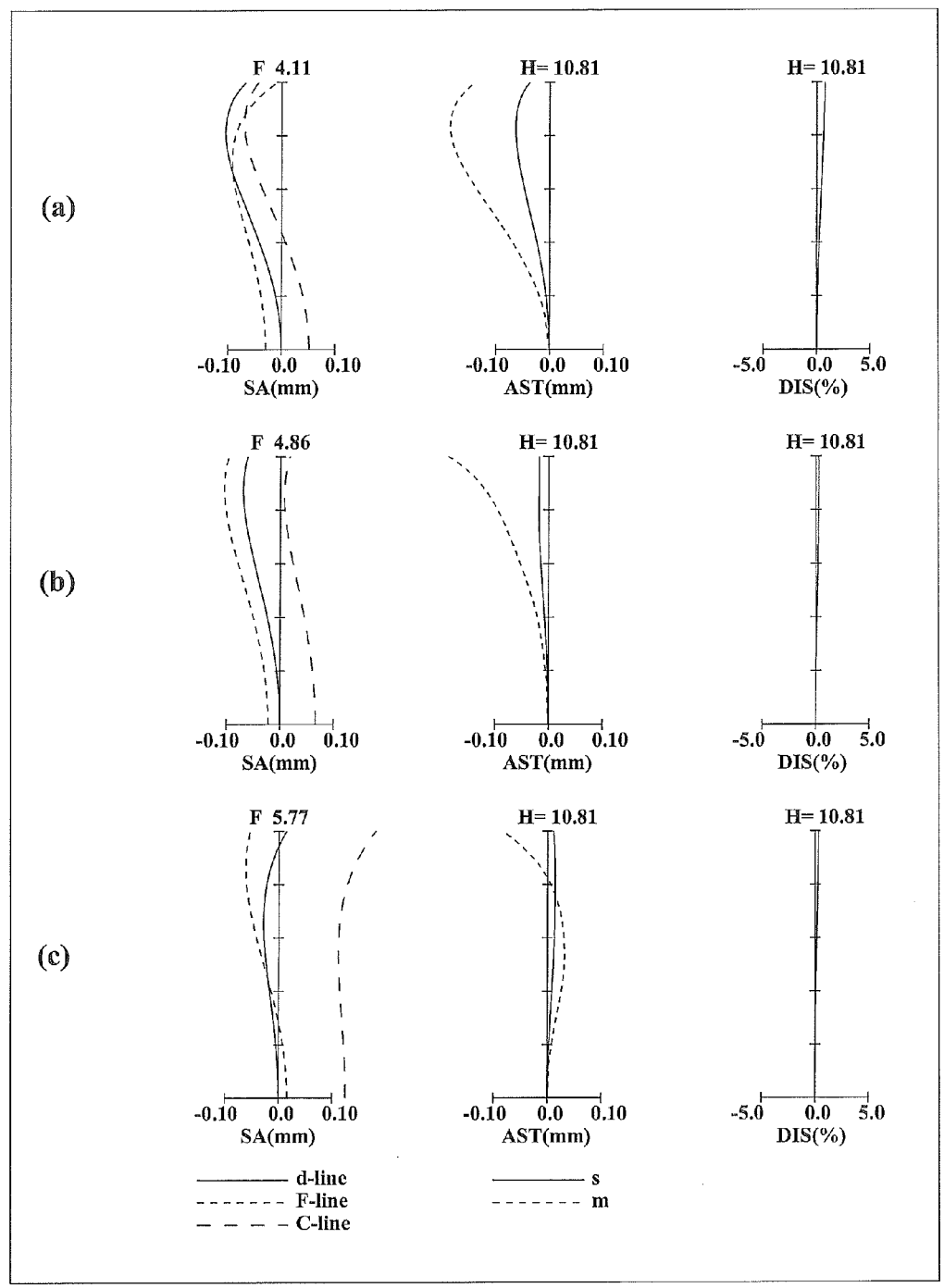
FIG. 11 is a longitudinal aberration diagram showing an infinity in-focus condition of a zoom lens system according to Example 4.
Figure 12:
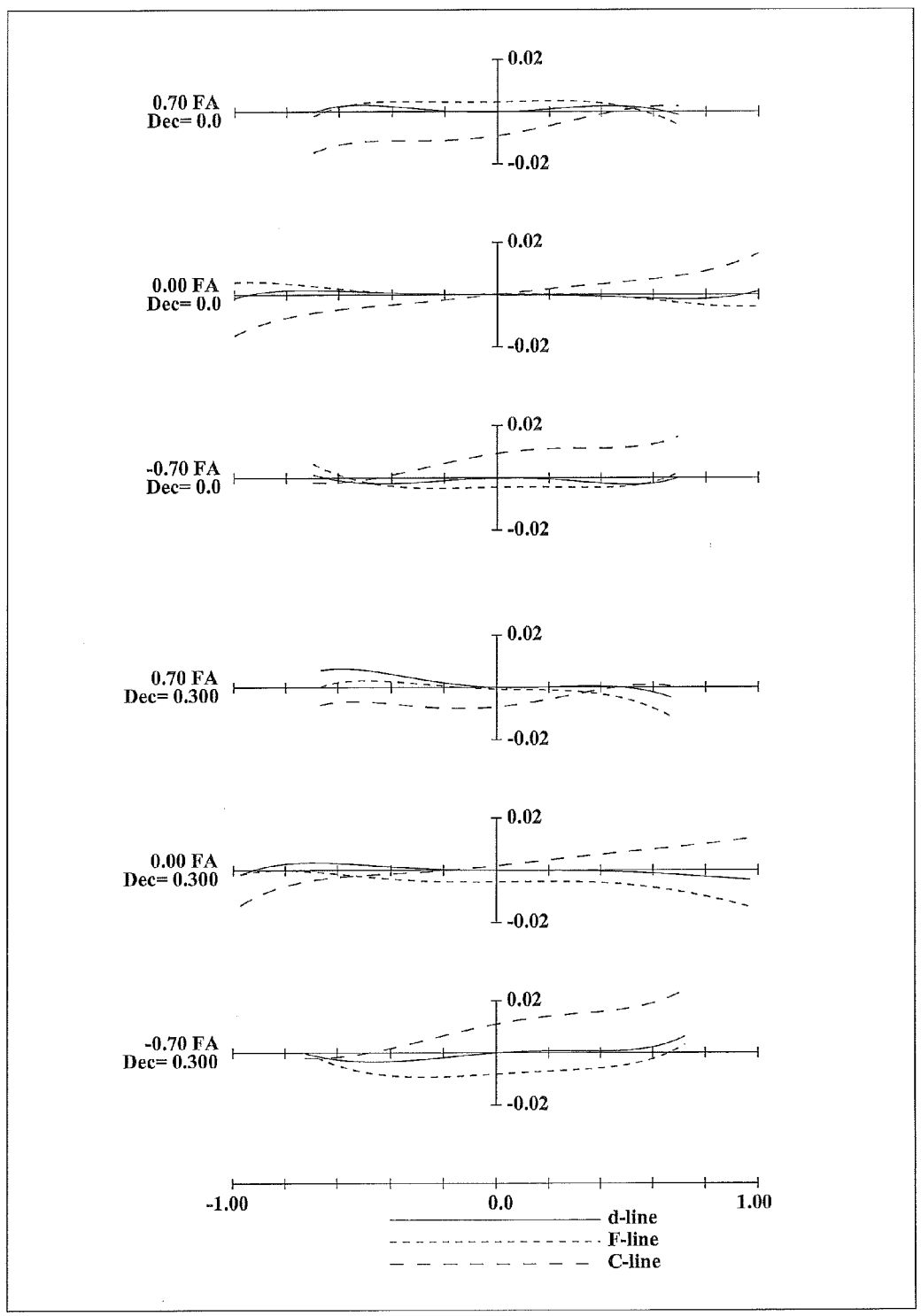
FIG. 12 is a lateral aberration diagram of a zoom lens system according to Example 4 at a telephoto limit in a basic state where image blur compensation is not performed and in an image blur compensation state.

The zoom lens system of Numerical Example 4 corresponds to Embodiment 4 shown in FIG. 10. Table 17 shows the surface data of the zoom lens system of Numerical Example 4. Table 18 shows the various data. Table 19 shows the single lens data. Table 20 shows the zoom lens unit data. Table 21 shows the magnification of zoom lens unit.

TABLE 17

(Surface data)

| Surface number | r | d | nd | vd |
|---|---|---|---|---|
| Object surface | ∞ | | | |
| 1 | 120.51440 | 4.10180 | 1.48749 | 70.4 |
| 2 | ∞ | 0.20010 | | |
| 3 | 85.63570 | 1.90070 | 1.68893 | 31.2 |
| 4 | 54.12160 | 6.40130 | 1.49700 | 81.6 |
| 5 | 300.49570 | Variable | | |
| 6 | 35.26850 | 0.90010 | 1.62004 | 36.3 |
| 7 | 21.47210 | 4.20330 | 1.48749 | 70.4 |
| 8 | ∞ | Variable | | |
| 9 | −78.36840 | 0.80070 | 1.77250 | 49.6 |
| 10 | 29.03300 | 1.31110 | | |
| 11 | 34.49490 | 2.30120 | 1.94595 | 18.0 |
| 12 | −162.95940 | 0.80060 | 1.90366 | 31.3 |
| 13 | 30.04010 | 4.26350 | | |
| 14(Diaphragm) | ∞ | 17.19270 | | |
| 15 | 51.39220 | 2.50010 | 1.58913 | 61.3 |
| 16 | −73.34390 | 0.15010 | | |
| 17 | 26.75080 | 0.80000 | 1.84666 | 23.8 |
| 18 | 14.98860 | 5.02380 | 1.58913 | 61.3 |
| 19 | −87.43470 | Variable | | |
| 20 | 23.23170 | 0.80040 | 1.77250 | 49.6 |
| 21 | 13.10340 | 2.08040 | | |
| 22 | −50.37300 | 2.05100 | 1.84666 | 23.8 |
| 23 | −17.74240 | 0.80040 | 1.77250 | 49.6 |
| 24 | 32.73270 | Variable | | |
| 25 | 22.41450 | 5.10110 | 1.51680 | 64.2 |
| 26 | −22.45190 | 3.69230 | | |
| 27 | −18.20830 | 0.80070 | 1.91082 | 35.2 |
| 28 | −312.61980 | 0.15000 | | |
| 29 | 43.52060 | 2.30080 | 1.84666 | 23.8 |
| 30 | −637.06910 | (BF) | | |
| Image surface | ∞ | | | |

TABLE 18

(Various data)
Zooming ratio 2.82617

|  | Wide-angle limit | Middle position | Telephoto limit |
|---|---|---|---|
| Focal length | 102.7209 | 174.1910 | 290.3070 |
| F-number | 4.11397 | 4.86257 | 5.77082 |
| View angle | 5.9655 | 3.5449 | 2.1271 |
| Image height | 10.8150 | 10.8150 | 10.8150 |
| Overall length of lens system | 142.4843 | 171.6440 | 200.8351 |
| BF | 15.42012 | 27.89229 | 42.07583 |
| d5 | 33.6396 | 57.5749 | 83.6685 |
| d8 | 7.4452 | 7.4930 | 2.3486 |

TABLE 18-continued (Various data)
Zooming ratio 2.82617

|  | Wide-angle limit | Middle position | Telephoto limit |
| --- | --- | --- | --- |
| d19 | 12.4788 | 6.1560 | 1.0408 |
| d24 | 2.8724 | 1.8996 | 1.0732 |
| Entrance pupil position | 115.4380 | 228.5110 | 418.3390 |
| Exit pupil position | −33.5913 | −31.0628 | −29.0520 |
| Front principal points position | 2.8704 | −111.9699 | −476.2374 |
| Back principal points position | 39.7634 | −2.5471 | −89.4719 |

TABLE 19

(Single lens data)

| Lens element | Initial surface number | Focal length |
| --- | --- | --- |
| 1 | 1 | 247.2143 |
| 2 | 3 | −218.8586 |
| 3 | 4 | 131.6830 |
| 4 | 6 | −90.7942 |
| 5 | 7 | 44.0463 |
| 6 | 9 | −27.3348 |
| 7 | 11 | 30.2670 |
| 8 | 12 | −28.0134 |
| 9 | 15 | 51.6771 |
| 10 | 17 | −41.5582 |
| 11 | 18 | 22.1210 |
| 12 | 20 | −40.2950 |
| 13 | 22 | 31.4438 |
| 14 | 23 | −14.7920 |
| 15 | 25 | 22.5787 |
| 16 | 27 | −21.2550 |
| 17 | 29 | 48.1902 |

TABLE 20

(Zoom lens unit data)

| Lens unit | Initial surface No. | Focal length | Overall length of lens unit | Front principal points position | Back principal points position |
| --- | --- | --- | --- | --- | --- |
| 1 | 1 | 143.13818 | 12.60390 | −0.61627 | 3.73372 |
| 2 | 6 | 87.20136 | 5.10340 | −0.29909 | 1.42586 |
| 3 | 9 | 25.73933 | 35.14380 | 26.82042 | 56.50803 |
| 4 | 20 | −15.70240 | 5.73220 | 2.42875 | 4.15321 |
| 5 | 25 | 41.35217 | 12.04490 | −3.41568 | 0.71736 |

TABLE 21

(Magnification of zoom lens unit)

| Lens unit | Initial surface No. | Wide-angle limit | Middle position | Telephoto limit |
| --- | --- | --- | --- | --- |
| 1 | 1 | 0.00000 | 0.00000 | 0.00000 |
| 2 | 6 | 0.46352 | 0.53109 | 0.63144 |
| 3 | 9 | 0.74438 | 0.89878 | 1.02826 |
| 4 | 20 | 5.88911 | 49.44138 | −10.71862 |
| 5 | 25 | 0.35317 | 0.05157 | −0.29143 |

Numerical Example 5

The zoom lens system of Numerical Example 5 corresponds to Embodiment 5 shown in FIG. 13. Table 22 shows the surface data of the zoom lens system of Numerical Example 5. Table 23 shows the various data. Table 24 shows the single lens data. Table 25 shows the zoom lens unit data. Table 26 shows the magnification of zoom lens unit.

TABLE 22

(Surface data)

| Surface number | r | d | nd | vd |
| --- | --- | --- | --- | --- |
| Object surface | ∞ | | | |
| 1 | 105.89260 | 5.00000 | 1.48749 | 70.4 |
| 2 | −871.75260 | 0.20000 | | |
| 3 | 86.18050 | 1.33530 | 1.64769 | 33.8 |
| 4 | 47.06930 | 7.00000 | 1.49700 | 81.6 |
| 5 | 398.98120 | Variable | | |
| 6 | 43.86320 | 0.84520 | 1.67003 | 47.2 |
| 7 | 33.22840 | 3.27060 | 1.51680 | 64.2 |
| 8 | 70.73210 | Variable | | |
| 9 | −250.05990 | 0.80180 | 1.75520 | 27.5 |
| 10 | 16.74320 | 2.88910 | 1.94595 | 18.0 |
| 11 | 97.25830 | 0.56640 | | |
| 12 | −646.14680 | 0.93390 | 1.84666 | 23.9 |
| 13 | 36.72480 | Variable | | |
| 14(Diaphragm) | ∞ | 16.80340 | | |
| 15 | 33.28620 | 2.28540 | 1.49700 | 81.6 |
| 16 | −557.69320 | 0.20000 | | |
| 17 | ∞ | 0.80000 | 1.72825 | 28.3 |
| 18 | 26.92120 | 4.26840 | | |
| 19 | 50.35330 | 2.67760 | 1.51680 | 64.2 |
| 20 | −47.97910 | 0.20000 | | |
| 21 | 25.91350 | 2.57160 | 1.60625 | 63.7 |
| 22 | 1577.45080 | Variable | | |
| 23 | 152.45800 | 0.80000 | 1.91082 | 35.2 |
| 24 | 22.04310 | 1.45300 | | |
| 25 | −39.80080 | 2.73090 | 1.75211 | 25.0 |
| 26 | −11.67920 | 0.80000 | 1.73351 | 51.2 |
| 27 | 79.18850 | 1.71970 | | |
| 28 | 29.23330 | 4.89890 | 1.48749 | 70.4 |
| 29 | −17.50910 | 2.80320 | | |
| 30 | −14.92960 | 0.80000 | 1.73351 | 51.2 |
| 31 | −27.07170 | 0.20000 | | |
| 32 | −420.46250 | 1.33660 | 1.84666 | 23.8 |
| 33 | −169.62320 | (BF) | | |
| Image surface | ∞ | | | |

TABLE 23

(Various data)
Zooming ratio 2.82430

|  | Wide-angle limit | Middle position | Telephoto limit |
| --- | --- | --- | --- |
| Focal length | 103.0002 | 173.1132 | 290.9033 |
| F-number | 4.10008 | 5.20084 | 5.77077 |
| View angle | 6.0244 | 3.5079 | 2.0889 |
| Image height | 10.8150 | 10.8150 | 10.8150 |
| Overall length of lens system | 143.9705 | 172.0082 | 193.2900 |
| BF | 19.99859 | 21.19552 | 42.76568 |
| d5 | 1.6399 | 52.1654 | 63.7170 |
| d8 | 22.0268 | 5.8466 | 4.0101 |
| d13 | 13.4234 | 12.3236 | 11.2572 |
| d22 | 16.6908 | 10.2861 | 1.3490 |
| Entrance pupil position | 105.3193 | 281.7077 | 405.2532 |
| Exit pupil position | −45.9299 | −45.8110 | −45.6343 |

TABLE 23-continued (Various data)
Zooming ratio 2.82430

|  | Wide-angle limit | Middle position | Telephoto limit |
|---|---|---|---|
| Front principal points position | 47.4019 | 7.5779 | −261.1375 |
| Back principal points position | 40.9702 | −1.1050 | −97.6133 |

TABLE 24

(Single lens data)

| Lens element | Initial surface number | Focal length |
|---|---|---|
| 1 | 1 | 194.0175 |
| 2 | 3 | −162.3104 |
| 3 | 4 | 106.6703 |
| 4 | 6 | −211.2811 |
| 5 | 7 | 117.7646 |
| 6 | 9 | −20.7524 |
| 7 | 10 | 21.0142 |
| 8 | 12 | −41.0177 |
| 9 | 15 | 63.2836 |
| 10 | 17 | −36.9670 |
| 11 | 19 | 47.9855 |
| 12 | 21 | 43.4306 |
| 13 | 23 | −28.3749 |
| 14 | 25 | 21.0983 |
| 15 | 26 | −13.8244 |
| 16 | 28 | 23.2619 |
| 17 | 30 | −46.6816 |
| 18 | 32 | 335.0012 |

TABLE 25

(Zoom lens unit data)

| Lens unit | Initial surface No. | Focal length | Overall length of lens unit | Front principal points position | Back principal points position |
|---|---|---|---|---|---|
| 1 | 1 | 120.88971 | 13.53530 | 0.43112 | 4.98053 |
| 2 | 6 | 276.37473 | 4.11580 | −6.03129 | −4.39709 |
| 3 | 9 | −39.41433 | 5.19120 | 3.41181 | 5.54983 |
| 4 | 14 | 29.28596 | 29.80640 | 25.59273 | 28.44233 |
| 5 | 23 | −33.94750 | 17.54230 | −2.59625 | 0.99307 |

TABLE 26

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 0.70306 | 0.80676 | 0.83491 |
| 3 | 9 | −4.53033 | 10.43326 | 4.05412 |
| 4 | 14 | −0.12882 | 0.08056 | 0.25878 |
| 5 | 23 | 2.07660 | 2.11186 | 2.74725 |

Numerical Example 6

Figure 16:
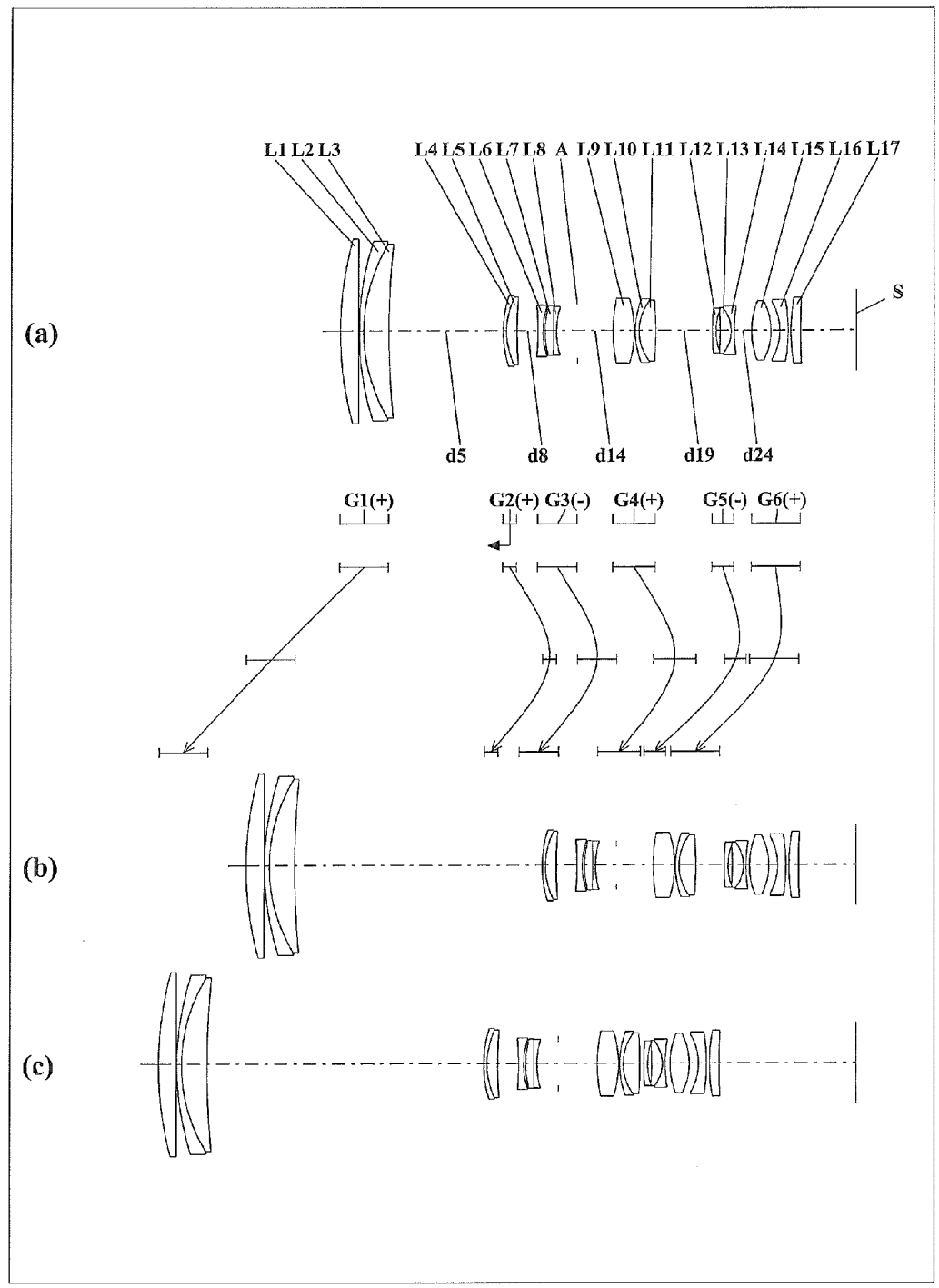
FIG. 16 is a lens arrangement diagram showing an infinity in-focus condition of a zoom lens system according to Embodiment 6 (Example 6)
Figure 17:
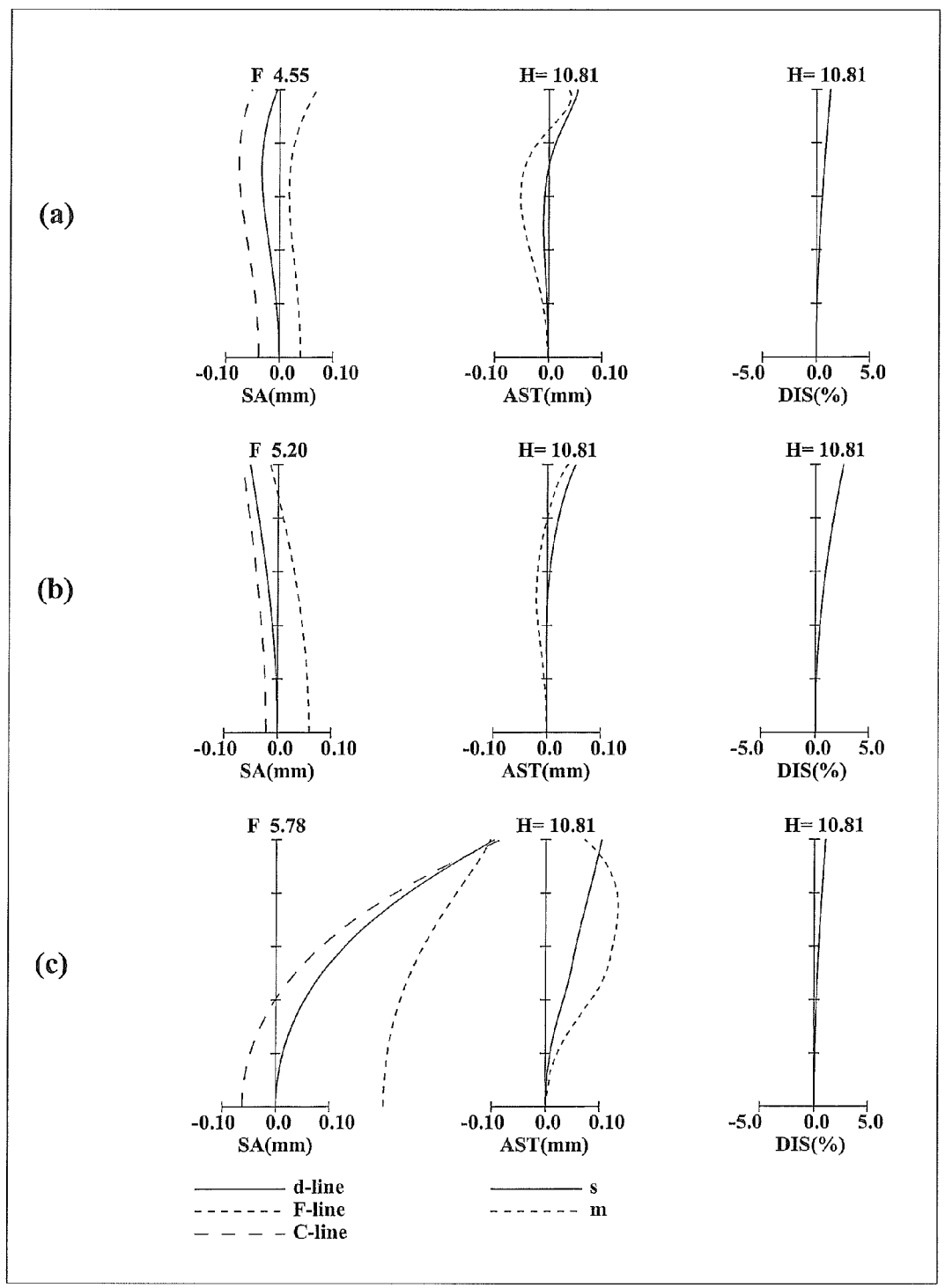
FIG. 17 is a longitudinal aberration diagram of an infinity in-focus condition of a zoom lens system according to Example 6.
Figure 18:
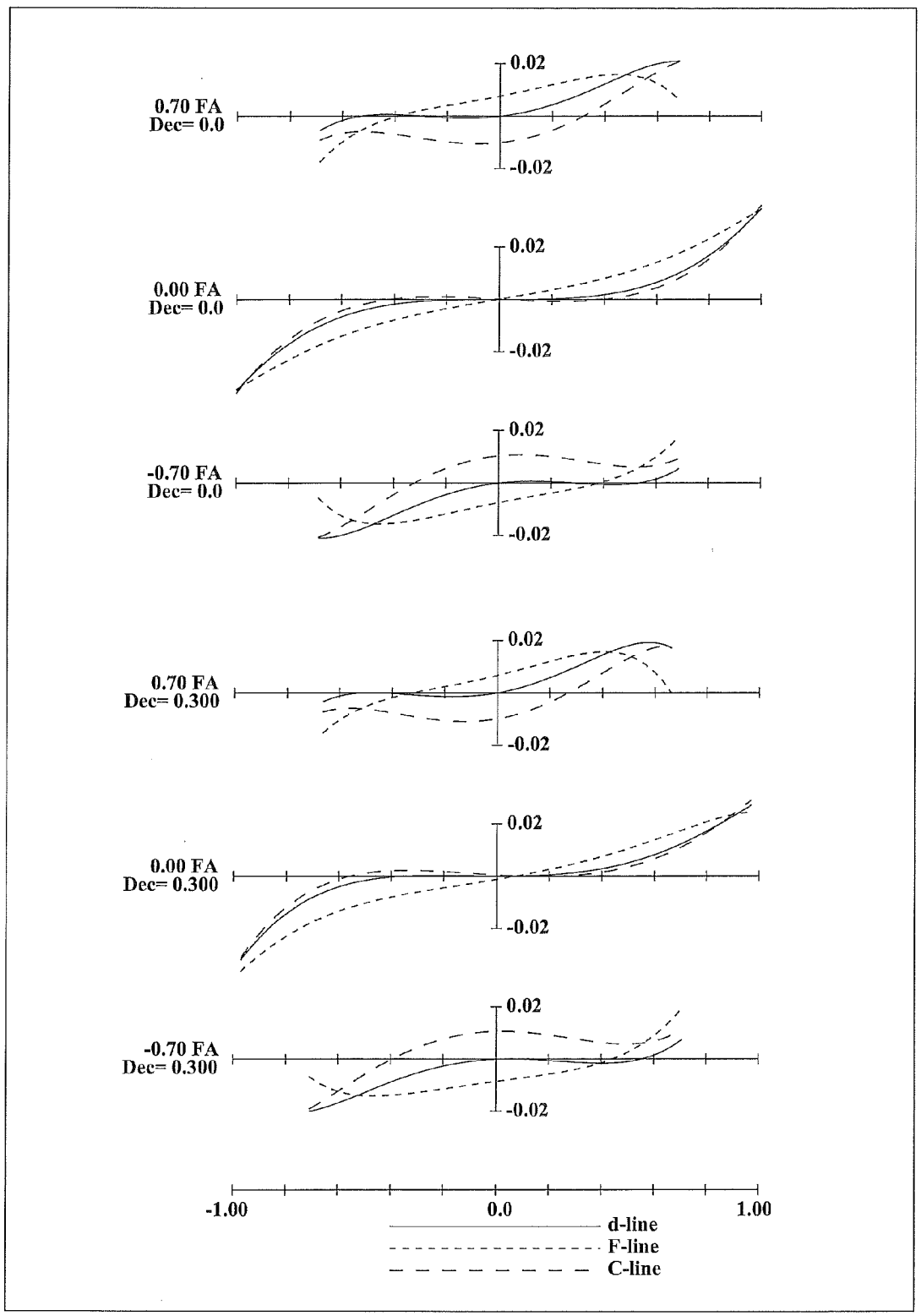
FIG. 18 is a lateral aberration diagram of a zoom lens system according to Example 6 at a telephoto limit in a basic state where image blur compensation is not performed and in an image blur compensation state.

The zoom lens system of Numerical Example 6 corresponds to Embodiment 6 shown in FIG. 16. Table 27 shows the surface data of the zoom lens system of Numerical Example 6. Table 28 shows the various data. Table 29 shows the single lens data. Table 30 shows the zoom lens unit data. Table 31 shows the magnification of zoom lens unit.

TABLE 27

(Surface data)

| Surface number | r | d | nd | vd |
|---|---|---|---|---|
| Object surface | ∞ | | | |
| 1 | 99.04070 | 5.00000 | 1.49700 | 81.6 |
| 2 | ∞ | 0.20000 | | |
| 3 | 82.63490 | 1.27930 | 1.67650 | 37.5 |
| 4 | 47.00670 | 7.00000 | 1.49700 | 81.6 |
| 5 | 240.72960 | Variable | | |
| 6 | 32.92370 | 0.90250 | 1.60342 | 38.0 |
| 7 | 22.42840 | 2.90130 | 1.51680 | 64.2 |
| 8 | 104.45240 | Variable | | |
| 9 | −89.07080 | 1.40320 | 1.72342 | 38.0 |
| 10 | 20.64910 | 0.62360 | | |
| 11 | 26.81790 | 2.26110 | 1.94595 | 18.0 |
| 12 | −206.23740 | 0.80040 | 1.90366 | 31.3 |
| 13 | 23.24830 | 5.84350 | | |
| 14(Diaphragm) | ∞ | Variable | | |
| 15 | 43.03810 | 5.94120 | 1.49700 | 81.6 |
| 16 | −31.01760 | 0.28340 | | |
| 17 | 26.05160 | 0.95960 | 1.68893 | 31.2 |
| 18 | 13.96220 | 4.71060 | 1.49700 | 81.6 |
| 19 | −111.11380 | Variable | | |
| 20 | 59.15000 | 1.08380 | 1.85135 | 40.1 |
| 21 | 17.22700 | 1.15720 | | |
| 22 | −80.82860 | 3.08070 | 1.72825 | 28.3 |
| 23 | −10.07310 | 0.80000 | 1.72916 | 54.7 |
| 24 | 42.04320 | Variable | | |
| 25 | 22.81430 | 5.35660 | 1.51680 | 64.2 |
| 26 | −17.90450 | 2.58550 | | |
| 27 | −15.36210 | 2.29320 | 1.91082 | 35.2 |
| 28 | −54.17000 | 0.81940 | | |
| 29 | 52.13100 | 2.68610 | 1.72342 | 38.0 |
| 30 | 175.76020 | (BF) | | |
| Image surface | ∞ | | | |

TABLE 28

(Various data)
Zooming ratio 2.82509

|  | Wide-angle limit | Middle position | Telephoto limit |
|---|---|---|---|
| Focal length | 103.0010 | 173.1361 | 290.9877 |
| F-number | 4.55042 | 5.20103 | 5.78474 |
| View angle | 5.9189 | 3.4844 | 2.1059 |
| Image height | 10.8150 | 10.8150 | 10.8150 |
| Overall length of lens system | 143.8189 | 169.6392 | 193.7415 |
| BF | 15.54071 | 15.91288 | 38.11589 |
| d5 | 31.8584 | 68.7782 | 76.8085 |
| d8 | 5.7854 | 5.7854 | 5.7854 |
| d14 | 9.9086 | 10.1964 | 10.8095 |
| d19 | 15.7690 | 8.0125 | 0.9805 |
| d24 | 4.9846 | 0.9816 | 1.2695 |
| Entrance pupil position | 107.7453 | 346.4649 | 477.3191 |
| Exit pupil position | −39.8070 | −29.5118 | −29.6517 |
| Front principal points position | 19.0634 | −140.3075 | −481.1668 |
| Back principal points position | 40.8179 | −3.4969 | −97.2462 |

TABLE 29

(Single lens data)

| Lens element | Initial surface number | Focal length |
|---|---|---|
| 1 | 1 | 199.2782 |
| 2 | 3 | −163.5310 |
| 3 | 4 | 116.1383 |
| 4 | 6 | −120.4978 |
| 5 | 7 | 54.6075 |
| 6 | 9 | −23.0482 |
| 7 | 11 | 25.2070 |
| 8 | 12 | −23.0824 |
| 9 | 15 | 37.2626 |
| 10 | 17 | −45.1339 |
| 11 | 18 | 25.2731 |
| 12 | 20 | −28.8934 |
| 13 | 22 | 15.5164 |
| 14 | 23 | −11.0729 |
| 15 | 25 | 20.3221 |
| 16 | 27 | −24.2250 |
| 17 | 29 | 101.5229 |

TABLE 30

(Zoom lens unit data)

| Lens unit | Initial surface No. | Focal length | Overall length of lens unit | Front principal points position | Back principal points position |
|---|---|---|---|---|---|
| 1 | 1 | 134.59933 | 13.47930 | −0.77220 | 3.86432 |
| 2 | 6 | 102.60456 | 3.80380 | −1.48193 | −0.10152 |
| 3 | 9 | −21.13523 | 10.93180 | 1.97244 | 4.14693 |
| 4 | 15 | 23.35858 | 11.89480 | 3.37451 | 7.07243 |
| 5 | 20 | −15.72154 | 6.12170 | 1.83558 | 4.07403 |
| 6 | 25 | 43.01797 | 13.74080 | −2.03649 | 2.40492 |

TABLE 31

(Magnification of zoom lens unit)

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | 0.52027 | 0.64011 | 0.67387 |
| 3 | 9 | −1.28688 | −5.11971 | −31.81352 |
| 4 | 15 | −0.51858 | −0.18489 | −0.03380 |
| 5 | 20 | 5.87382 | 5.79130 | −19.94996 |
| 6 | 25 | 0.37522 | 0.36657 | −0.14956 |

The following Table 32 shows the corresponding values to the individual conditions in the zoom lens systems of each of Numerical Examples.

TABLE 32

(Values corresponding to conditions)

| | | Numerical Example | | | | | |
|---|---|---|---|---|---|---|---|
| | Condition | 1 | 2 | 3 | 4 | 5 | 6 |
| (1) | $(1/vd_{MIN}) - (1/vd_{MAX})$ | 0.013 | 0.016 | 0.025 | 0.020 | 0.017 | 0.014 |
| (2) | $|m|/(f_T - f_W)$ | 0.208 | 0.128 | 0.181 | 0.142 | 0.121 | 0.121 |
| (3) | $f_1/f_2$ | 1.291 | 1.419 | 1.299 | 1.641 | 0.437 | 1.312 |
| (4) | $D_{12W}/f_W$ | 0.340 | 0.309 | 0.244 | 0.327 | 0.016 | 0.309 |

The zoom lens system according to the present invention is applicable to a digital still camera, a digital video camera, a camera for a mobile telephone, a camera for a PDA (Personal Digital Assistance), a surveillance camera in a surveillance system, a Web camera, a vehicle-mounted camera or the like. In particular, the zoom lens system according to the present invention is suitable for a photographing optical system where high image quality is required like in a digital still camera system or a digital video camera system.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system having a plurality of lens units, each lens unit being composed of at least one lens element, the zoom lens system, in order from an object side to an image side, comprising:
    a first lens unit having positive optical power;
    a second lens unit having positive optical power; and
    at least two subsequent lens units, wherein
    the first lens unit moves along an optical axis at the time of zooming from a wide-angle limit to a telephoto limit,
    an interval between the second lens unit and a lens unit which is one of the at least two subsequent lens units varies at the time of zooming or at the time of focusing from an infinity in-focus condition to a close-object in-focus condition,
    the first lens unit is composed of at least three lens elements,
    each of the first lens unit and the second lens unit includes at least one lens element having negative optical power, and
    the following conditions (1) and (2) are satisfied:

$$0.008 < (1/vd_{MIN}) - (1/vd_{MAX}) < 0.028 \quad (1)$$

$$0.1 < |m|/(f_T - f_W) < 0.4 \quad (2)$$

where
    $vd_{MIN}$ is the minimum value among Abbe numbers to the d-line of each lens element constituting the first lens unit,
    $vd_{MAX}$ is the maximum value among Abbe numbers to the d-line of each lens element constituting the first lens unit,
    m is the maximum value among the amounts of movement of each subsequent lens unit at the time of zooming from a wide-angle limit to a telephoto limit,
    $f_T$ is a focal length of the entire system at a telephoto limit, and
    $f_W$ is a focal length of the entire system at a wide-angle limit.

2. The zoom lens system as claimed in claim 1, wherein an aperture diaphragm is arranged in the lens unit which is one of the at least two subsequent lens units, and
    a lens unit located on the object side relative to the aperture diaphragm performs focusing from an infinity in-focus condition to a close-object in-focus condition.

3. The zoom lens system as claimed in claim 1, wherein an aperture diaphragm is arranged in the lens unit which is one of the at least two subsequent lens units, and
    a lens unit located on the image side relative to the aperture diaphragm optically compensates image blur.

4. The zoom lens system as claimed in claim 3, wherein a part of a lens unit having negative optical power or an entirety of the lens unit having negative optical power optically compensates image blur, and at least one lens unit having positive optical power or at least one lens element having positive optical power is arranged on the image side relative to the lens unit having negative optical power.

5. The zoom lens system as claimed in claim 1, wherein the following condition (3) is satisfied:

$$0.2 < f_1/f_2 < 2.0 \qquad (3)$$

where
$f_1$ is a focal length of the first lens unit, and
$f_2$ is a focal length of the second lens unit.

6. The zoom lens system as claimed in claim 1, wherein the following condition (4) is satisfied:

$$0.01 < D_{12W}/f_W < 0.45 \qquad (4)$$

where
$D_{12W}$ is an axial interval between the first lens unit and the second lens unit at a wide-angle limit, and
$f_W$ is a focal length of the entire system at a wide-angle limit.

7. An interchangeable lens apparatus comprising:
the zoom lens system as claimed in claim 1; and
a lens mount section which is connectable to a camera body including an image sensor for receiving an optical image formed by the zoom lens system and converting the optical image into an electric image signal.

8. A camera system comprising:
an interchangeable lens apparatus including the zoom lens system as claimed in claim 1; and
a camera body which is detachably connected to the interchangeable lens apparatus via a camera mount section, and includes an image sensor for receiving an optical image formed by the zoom lens system and converting the optical image into an electric image signal.

* * * * *